United States Patent
Commins et al.

(10) Patent No.: US 6,643,986 B2
(45) Date of Patent: *Nov. 11, 2003

(54) DIAPHRAGM WITH PERIMETER EDGING ON STRUCTURAL PANELS

(75) Inventors: Alfred D. Commins, Danville; Robert C. Gregg, Yorba Linda, both of CA (US)

(73) Assignee: Simpson Strong-Tie Company, Inc., Dublin, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/873,972

(22) Filed: Jun. 12, 1997

(65) Prior Publication Data

US 2002/0095896 A1 Jul. 25, 2002

(51) Int. Cl.[7] .............................. E04B 2/28; E04H 9/02
(52) U.S. Cl. ................... 52/483.1; 52/309.2; 52/800.12; 52/800.18
(58) Field of Search ........................... 52/483.1, 800.12, 52/800.18, 309.2

(56) References Cited

U.S. PATENT DOCUMENTS

| | | | |
|---|---|---|---|
| 328,185 A | * 10/1885 | Butcher | 52/483.1 |
| 673,558 A | * 5/1901 | Kline | 52/483.1 |
| 1,719,200 A | 7/1929 | Schumacher | |
| 1,997,809 A | 4/1935 | Cole | |
| 2,020,988 A | 11/1935 | Balletta | |
| 2,063,010 A | 12/1936 | Balduf | |
| 2,080,593 A | 5/1937 | Albert | |
| 2,137,767 A | 11/1938 | Betcone | |
| 2,154,520 A | 4/1939 | Mackin | |
| 2,160,225 A | 5/1939 | Newman | |
| 2,193,550 A | 3/1940 | Coe | |
| 2,278,331 A | 3/1942 | Meyercord | |
| 2,281,185 A | 4/1942 | Forster | |

(List continued on next page.)

FOREIGN PATENT DOCUMENTS

| | | |
|---|---|---|
| CH | 419 526 | 3/1967 |
| JP | 10-140653 A | 5/1998 |
| NZ | 186060 | 11/1980 |
| NZ | 221612 | 3/1993 |

OTHER PUBLICATIONS

Simpson Strong–Tie Company, Inc. catalog, 1997, p. 53.
Author: Breyer, Donald E. Title of the Book: Third Edition Design of Wood Structures 1993, p. 434.

(List continued on next page.)

Primary Examiner—Yvonne M. Horton
(74) Attorney, Agent, or Firm—Charles R. Cypher; James R. Cypher

(57) ABSTRACT

The present invention relates to horizontal, vertical or angularly disposed diaphragms which resist structural forces. Specifically, the present invention relates to an improved mechanical connection between a structural panel and the framing members that support the structural panel forming a diaphragm. The connection includes: a structural panel having a distal side, a proximal side, and a plurality of edge faces; a frame consisting of a plurality of framing members disposed in registration with the proximal side of the structural panel near the edge faces; a plurality of perimeter fasteners connecting the structural panel to the framing members; and clips or perimeter edging members for reducing bending of the perimeter fasteners attached to a substantial number of the perimeter fasteners. The clips or perimeter edging members for reducing bending of the perimeter fasteners act when lateral forces are imposed on the building structure of which the diaphragm is a part.

38 Claims, 11 Drawing Sheets

U.S. PATENT DOCUMENTS

| | | | |
|---|---|---|---|
| 2,457,964 A | | 1/1949 | Wyche |
| 2,633,610 A | | 4/1953 | Hervey |
| 2,743,980 A | * | 5/1956 | Hobbs ................ 52/800.12 X |
| 2,803,856 A | | 8/1957 | Kofhal et al. |
| 3,310,917 A | | 3/1967 | Simon |
| 3,328,927 A | | 7/1967 | Kates |
| 3,748,799 A | | 7/1973 | Tough et al. |
| 3,775,920 A | * | 12/1973 | Schneller ............. 52/800.12 X |
| 4,016,697 A | | 4/1977 | Ericson |
| 4,037,381 A | | 7/1977 | Charles |
| 4,114,333 A | | 9/1978 | Jones |
| 4,283,892 A | | 8/1981 | Brown |
| 4,295,299 A | | 10/1981 | Nelson |
| 4,471,591 A | | 9/1984 | Jamison |
| 4,498,264 A | | 2/1985 | McCafferty |
| 4,552,094 A | | 11/1985 | Johnson |
| 4,879,160 A | * | 11/1989 | Knudson et al. ....... 52/309.2 X |
| 5,524,406 A | * | 6/1996 | Ragland ............. 52/800.12 X |
| 5,706,626 A | | 1/1998 | Mueller |
| 5,870,870 A | | 2/1999 | Utzman |
| 5,921,054 A | | 7/1999 | Rudd |
| 6,158,184 A | | 12/2000 | Timmerman, Sr. et al. |
| 6,244,004 B1 | | 6/2001 | Timmerman, Sr. et al. |

OTHER PUBLICATIONS

Timmerman, T.L., Shearmax Panel, Date Unknown, Shear Transfer Systems, Hesperia, California.

Author Unknown, ICBO Evaluation Report—STS Prefabricated Lateral–Force Resisting Panel System,Jul. 1, 1998, Hesperia CA.

Tissell, John R., Wood Structural Panel Shear Walls,APA Engineered Wood Association Research Report, May 1993, Tacoma WA.

Ben L. Schmid Calculation Sheet, "Apartment Bldgs Seismic Strengthening," total of 1 pages (Jul. 30, 1994).

"Typical CS Installation as Floor–to–Floor Tie with Strap Attached Over Plywood," total of 1 page.

American Plywood Association Technical Note #N370B, Stapled Sheet Metal Blocking for APA Panel Diaphragms . . . Nov. 1993.

Tissell, John R., and Rose John Dl, APA Research Report #146, Roof Diaphragms for Manufactured Homes, Sep. 1993.

American Plywood Association Industrial Use Guide, Materials Handling, Revised Jan. 1995.

Mitzner, Raymond C., APA, Plywood for Tobacco Storage, May 1978.

American Plywood Association Data File, APA Collapsible Bin Design and Fabrication, 1997.

Keith, Edward L., APA Research Report, #153, Big Bin: Performance and Testing, May 1990.

American Plywood Association Case Study, The Produce Protector, making a case for plywood harvest bins, May 1996.

American Plywood Association Case Study, A Test of Time, plywood harvest bins span three decades in use, Nov. 1996.

Simpson Strong–Tie Catalog of 1996, page 56 showing CS/CSMT straps in Floor–to–Floor Tie instalation, copyright 1995.

Simpson Strong–Tie Catalog of 1996, p. 58, showing LTP4 installed over plywood sheathing, copyright 1995.

Breyer, Donald E., Design of Wood Structures, 1993, §§ 12.1 and 12.9 of Chapter 12. McGraw–Hill, 3rd Edition.

Simpson Strong–Tie Co., Inc., Catalog No. 79H–1, Copyright 1978, Cover and page 16.

Thallon, Rob. Graphic Guide to Frame Construction. Sep. 1991. pp., 70, 77, 79–82. The Taunton Press, CT.

American Plywood Association, 1992. APA Homeowner's Guide to Earthquake Safeguards. Total 12 pages.

Simpson Strong–Tie Co., Inc. Connectors for Earthquake Resistant Structures –retrofit & New Construction. 16 p.

Breyer, Donald E. Design of Wood Structures. 1993. Chapters 8–11 & §§3.1, 3.3 & 3.4 of Chapter 3.

Japanese Language Newspaper Article, 1 page.

Japanese Language Magazine Article, "Wide Focus", 2 pages, pp. 20 and 21.

Color Photocopies, Wood Framed Residential Project in Kobe Japan Utilizing MFG. LWM Steel Shear Pannels, 4 pages, 1996.

Timmerman, T. L., Shearmax Panel, Date Unknown, Shear Transfer Systems, Hesperia, CA.

Author Unknown, ICBO Evaluation Report –STS Prefabricated Lateral–Force Resisting Panel System, Jul. 1, 1998, Hesperia CA.

Tissell, John R., Wood Structural Panel Shear Walls, APA Engineered Wood Association Research Report, May 1993, Tacoma WA.

Ser. No. 60/043,835, "Lateral Force Resisting System," Apr. 14, 1997, Timothy L. Timmerman, total of 27 pages, printed both sides.

Edward L. Keith, P. E., "153 Big Bin: Performance and Testing," Research Report American Plywood Association, American Plywood Association (Tacoma, Washington U.S.A.), front cover, numbered 1–24, back cover, (May 1990).

American Plywood Association, "APA Homeowner's Guide to Earthquake Safeguards," American Plywood Association (Tacoma, Washington U.S.A.), total of 7 pages, printed both sides,(1992).

John R. Tissell, P. E. and John D. Rose, "146 Roof Diaphragms for Manufactured Homes," Research Report American Plywood Association, Technical Services Division, American Plywood Association (Tacoma, Washington U.S.A.), front cover, numbered pp. 3–30, back cover, (Revised Sep. 1993).

American Plywood Association, "Stapled Sheet Metal Blocking for APA Panel Diaphragms," Technical Note American American Plywood Association No. N370B, American Plywood Association (Tacoma, Washington U.S.A), total of page 1, printed both sides (Revised Nov. 1993).

American Plywood Association, "Materials Handling," APA The Engineered Wood Association Industrial Use Guide, American Plywood Association (Tacoma, Washington U.S.A.), front cover, numbered pp. 3–54, back cover (Revised Jan. 1995).

American Plywood Association, "The Produce Protector Making a Case for Plywood Harvest Bins," APA The Engineered Wood Association, American Plywood Association (Tacoma, Washington U.S.A.), total 1 page, printed both sides (May, 1996).

American Plywood Association, "A Test of Time Plywood Harvest Bins Span Three Decades in Use," APA The Egineered Wood Association, American Plywood Association (Tacoma, Washington U.S.A.), total 1 page, printed both sides (Nov. 1996).

American Plywood Association, "APA Collapsible Bin Design and Fabrication," APA The Engineered Wood Association, American Plywood Association (Tacoma, Washington U.S.A.), front cover, numbered pp. 2 and 3, back cover, (Feb. 1997).

American Plywood Association, "Plywood for Tabacco Storage," APA The Engineered Wood Association, American Plywood Association (Tacoma, Washington U.S.A.) total of 1 page, (at least as early as 1997).

Donald E. Breyer, "Design of Wood Structures," 3rd ed., McGraw–Hill, Inc. (New York, NY U.S.A.), front and back cover, numbered pp. 87, 92–97, 402–441, 443–496, 497–532, 533–559 (1993).

Donald E. Breyer, "Design of Wood Structures," 3rd ed., McGraw–Hill, Inc. (New York, NY U.S.A), front and back cover, number pp. 561, 562, 597–600 (1993).

Rob Thallon, "Graphic Guide to Frame Construction Details for builders and designers," The Taunton Press, Inc. (Newtown, CT U.S.A.), front and back cover, numbered pp. 70, 77, 79, 80–82 (Sep. 1991).

Simpson Strong–Tie Company, Inc., "Handbook of Structural Designs & Load Values," Strong–Tie Timber Connectors, Catalog No. 79H–1 1979, Simpson Strong–Tie Company, Inc. (U.S.A), front cover, numbered p. 16, (Sep. 1978).

Simpson Strong–Tie Company, Inc. "Connectors for Earthquake–Resistant Structures Retrofit & New Construction," Simpson Stong–Tie Connectors, Simpson Strong–Tie Company, Inc. (U.S.A.), front cover, numbered pp. 2–16, (1991).

Simpson Strong–Tie Company, Inc., "CS/CMST Coiled Straps," Simpson Strong–Tie Connectors, Simpson Strong–Tie Company, Inc. (U.S.A), numbered p. 56, (1995).

Simpson Strong–Tie Company, Inc., "LTP/A34/A35 Framing Anchors," Simpson Strong–Tie Connectors, Simpson Strong–Tie Company, Inc. (U.S.A), numbered p. 58, (1995).

Japanese Language Newspaper Article, total of 1 page.

Japanese Language Newspaper Article, "Focus Wide" numbered pp. 20 and 21.

"Wood Framed Residential Project in Kobe Japan Utilizing Manufactured LWM Steel Shear Panels," total of 4 pages, (1996).

Ser. No. 08/854,026, Patent No. 5,870,870, "Shear Panel Joint," filed May 9, 1997, Charles H. Utzman, total of 74 pages.

Ser. No. 08/975,940, "Building Wall for Resisting Lateral Forces," filed Nov. 21, 1997, Alfred D. Commins et al., total of 22 pages, printed both sides.

Ben L. Schmid Calculation Sheet, "Apartment Bldgs Seismic Strengthening," total of 1 page, (Jul. 30, 1994).

"Typical CS Installation as a Floor–to–Floor Tie with Strap Attached Over Plywood," total of 1 page.

* cited by examiner

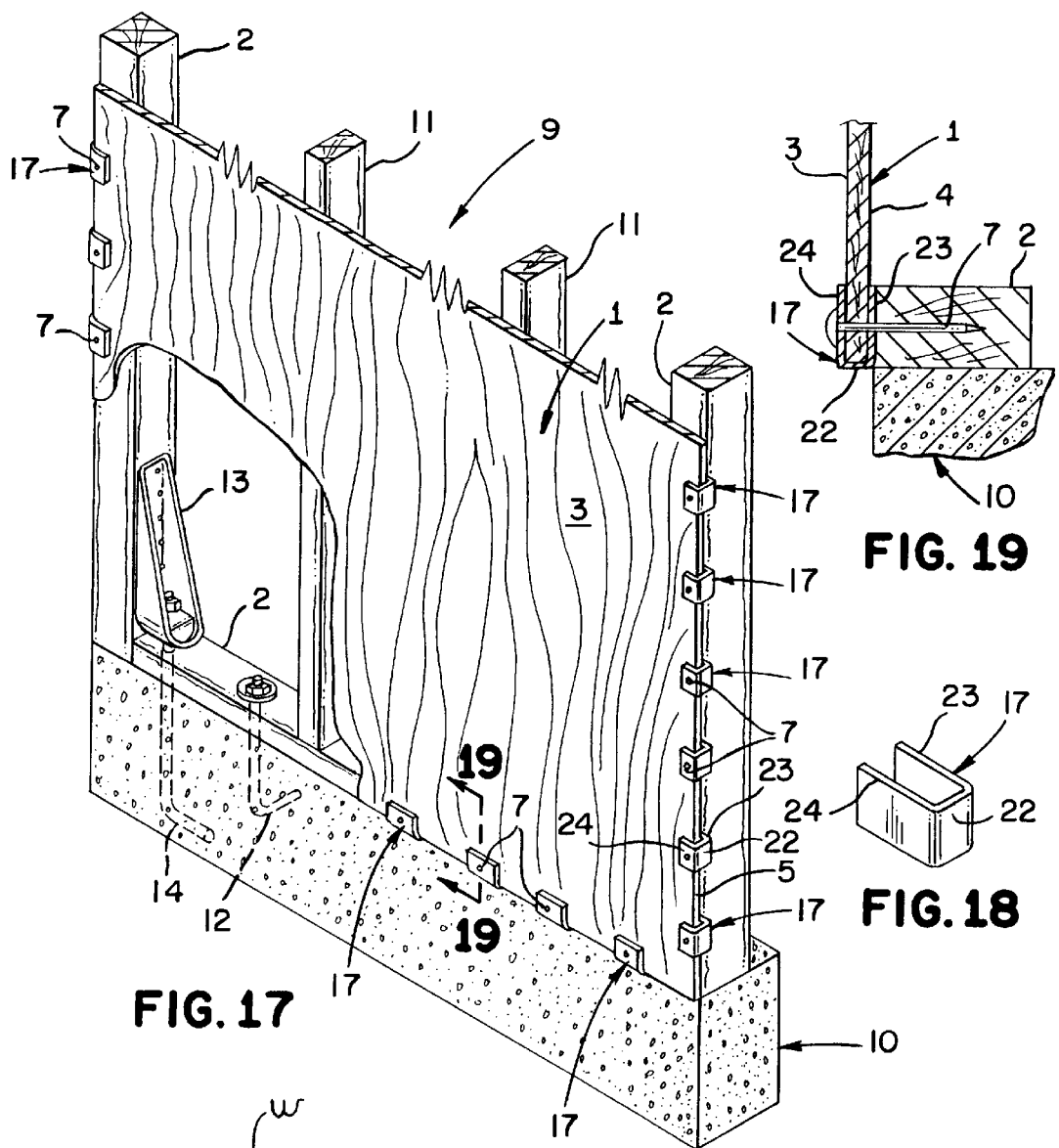
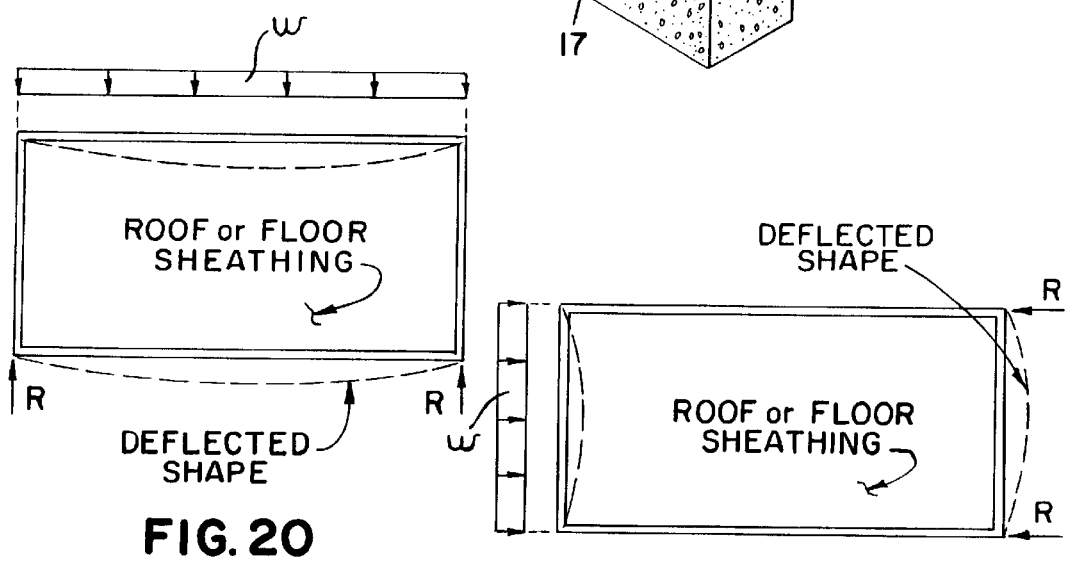

DIAPHRAGM WITH PERIMETER EDGING ON STRUCTURAL PANELS

BACKGROUND OF THE INVENTION

This invention relates to horizontal, vertical or angularly disposed diaphragms which resist structural forces. As herein used, a diaphragm is a large, thin structural element that is loaded in its plane. A diaphragm at its most basic level has three components: a shear resisting element, which consists of one or more structural panels, a frame and a fastening system for connecting the frame to the shear resisting element. The structural panels which make up the shear resisting element are commonly made of 4'×8' plywood or Oriented Strand Board (OSB) sheets. Vertical diaphragms in a structure are commonly called shearwalls. Specifically, this invention relates to an improved method of constructing diaphragms. The present invention improves on standard construction and fabrication methods to reduce the bending of the fasteners that make the mechanical connection between the structural panels and the perimeter framing members that support the structural panels.

All structures must be designed to resist lateral forces. Structural units designed to resist lateral forces are commonly called lateral force resisting systems. Lateral forces on a building are typically produced by wind loading and seismic forces. Both, but especially seismic forces, cause cyclic loading, that is, the force on the building reverses direction. The extensive damage caused to buildings by the January 1994 earthquake at Northridge, Calif. has demonstrated that lateral force resisting systems must be improved to better resist cyclic (reversed) lateral loading.

In general there are three types of lateral force resisting systems used in framed buildings. The first type, rigid frames, resist lateral forces by bending in the frame members. The second type, trusses or braced frames, resist lateral forces by primarily carrying the resulting tension and compression forces in diagonal members or cross braces. The third type, shearwalls or diaphragms, are large, flat structural units that act like deep, thin beams with the structural panel or panels of the diaphragms acting as the "web" of the beam and the chords of the diaphragms acting like the "flanges" of the beam. It is thought that shear deformation is the significant action in diaphragms.

The present invention provides an improved method of constructing shearwalls and horizontal diaphragms to serve as improved lateral force resisting systems.

When considered in its function of resisting lateral forces, a typical shearwall or diaphragm consists of three structural elements: a frame, a shear resisting element, and a fastening system for attaching the shear resisting element to the frame.

The diaphragm, in turn, is integrated into the structure via a connection system. The connection system must be designed to transfer the lateral forces imposed on the building into the diaphragm. In the case of shearwalls or vertical diaphragms, special anchors or transfer members for resisting the moment forces imposed on the shearwall may also be required.

In a shearwall, these special anchors typically consist of anchor bolts and holdowns, connecting the bottom of the chords to a structural member below the shearwall. These anchors resist tension forces acting to overturn the shearwall. A holdown is typically attached to the inner face of each chord with heavy screws, nails or bolts. The holdown receives a bolt which is connected to an anchoring structural member below.

Diaphragms and shearwalls are connected to the other structures of the building in a variety of ways so that lateral forces imposed on the building will be transferred to them. For example, it is common to attach a first story shearwall to the foundation on which it sits with foundation anchor bolts. The anchor bolts are embedded in the foundation and run through the bottom strut or mudsill of the shearwall and attach with a washer and nut.

When viewed in terms of resisting lateral forces, the frame is primarily an intermediate member, transmitting the lateral forces imposed on the building to the shear resisting element. It does this through the fastening system. In most diaphragms, the structural panels are attached to the frame with mechanical fasteners such as nails, screws or staples, spaced around the perimeter of the structural panels according to prescribed schedules. As used in this application, these fasteners located at the perimeter of the structural panel will be called perimeter fasteners to distinguish them from other fasteners located farther in from the edge faces of the structural panels. It should be noted that perimeter fasteners refer to the nails at the perimeter of the structural panels and not just the perimeter of the shear resisting element which can comprise a plurality of structural panels.

Nails commonly serve as the perimeter fasteners when wooden framing members are used. The perimeter fasteners are driven into the distal face of the structural panel at its perimeter, through the structural panel, and into the framing members. Through testing, the inventors have found that with improvements in the other elements of the typical shearwall, the perimeter fasteners have become the critical weak link through which failure of the overall system occurs.

The shear resisting element, as its name implies, works primarily in shear. The shear resisting element can be a single structural panel, if the diaphragm is small, or a number of structural panels, if the diaphragm is large. Typically structural panels for use in diaphragms are made of plywood or Oriented Strand Board (OSB) of structural grades, because they give a diaphragm high shear resisting values as well as having other desirable characteristics. Plywood and OSB come in many different grades. Typically, structural grades such as $15/32$" APA Structural 1 Rated Sheeting $32/16$, Exposure 1 are used in diaphragms to obtain sufficiently high shear values. Other types of structural panels include: fiberboard, waferboard, particle board, gypsum wall board and high density particle board. Structural panels made from composites of different materials are also known in the art. U.S. Pat. No. 4,016,697, granted to Ericson on Apr. 12, 1977 teaches completely cladding one side of gypsum wall board with a thin sheet of steel to improve its structural characteristics. Kevlar is also beginning to be used with engineered wood products as ply materials.

The most basic frame consists of chords and struts located at the perimeter of the diaphragm. In a shearwall, the top strut is commonly called the top plate and the bottom strut is commonly called the bottom plate or mudsill. The chords are commonly called end studs. The framing members can be made of wood, engineered wood products, such as glulam, or steel, to name a few common materials.

Most diaphragms will be made with a variety of layouts of the framing members. If a diaphragm consists of more than one structural panel, framing members need to be placed at the joint or joints of the structural panels to tie them together, and provide support to the structural panels. If the diaphragm serves as a load bearing structural element as well as a lateral force resisting element, intermediate members will often be added to strengthen the diaphragm against particular forces.

A shearwall, for example, is typically designed to serve as a load bearing unit for the structures above it, as well as a lateral force resisting element. Both forces work in the plane of the shearwall. In a wood frame building, the walls are built with intermediate studs that connect the top plate to the bottom plate to give the wall sufficient load bearing capacity. Ordinarily, these intermediate studs are spaced 16 inches on center from each other and from the end chords to give the shear wall sufficient strength.

For example, in an 8'×8' shear wall, comprising two 4'×8' structural panels disposed vertically, intermediate studs spaced 16" on center will occur both at the vertical joint of the 4'×8' structural panels and at intermediate points along each of the structural panels. The intermediate stud at the joint between the structural panels acts as a framing member to connect the structural panels to form a single shear resisting element. It also provides bearing support for the top plate. The other intermediate studs provide bearing support to the top plate. These other intermediate studs are also attached to the structural panels.

Sometimes, blocking members will be added to shear walls. Blocking members are relatively short lengths of board placed normal to and between the intermediate studs. If the shear wall is made with a horizontal joint between the structural panels, blocking will be added at the joint to connect the structural panels along the entire length of the joint. For shearwall action all edges of the structural panels must be supported. The blocking also provides support to the studs against buckling under compression loads transmitted through the top plate.

Horizontal diaphragms are also designed to serve as load bearing units, as well as a lateral force resisting systems. Horizontal diaphragms in wood frame construction serve as roofs and floor systems. Horizontal diaphragms, in their load bearing capacity, are loaded normal to their plane. As roof and floor systems, they are generally rather large; thus these diaphragms typically comprise a number of structural panels. These structural panels need to be connected at all their joints as well as the outer edges of the diaphragm. The structural panels also need to be supported at intermediate points to prevent excessive deflection under loading normal to the diaphragm. In a roof or floor, the framing members are given various names such as: stiffeners, rafters, joists, purlins, subpurlins, beams, headers, and girders. Blocking may also be provided.

As mentioned above, the inventors tested shearwalls made according to current building practices with the best commercially available components under cyclic loading conditions. They discovered that the predominant failure mode is the flexing and fatiguing of the nails around the perimeter or outer edges of the structural panels that connect the structural panels to the frame of the diaphragm. The present invention addresses this problem, allowing shearwalls and diaphragms to be both stronger and stiffer.

SUMMARY OF THE INVENTION

It is an object of the present invention to create a diaphragm that is highly resistant to failure under cyclic loading by lateral forces.

It is a further object of this invention to improve the mechanical connection between the structural panel and framing members of a diaphragm, so that the fasteners that make the mechanical connection can better withstand cyclic or reversing lateral forces by bending less under such forces.

BRIEF DESCRIPTION OF THE DRAWINGS

FIG. 17 is a portion of a shearwall constructed according to the present invention with substantially u-shaped clips.

FIG. 18 is an isometric view of substantially u-shaped clip.

FIG. 19 is side view of a portion of a shearwall constructed according to the present invention taken along line 19—19 of FIG. 17.

FIG. 20 is a schematic of a horizontal diaphragm, showing a lateral load (w) on a diaphragm with resistance (R) being generated at the framing members parallel to the load.

FIG. 21 is a schematic of a horizontal diaphragm, showing a lateral load (w) on a diaphragm with resistance (R) being generated at the framing members parallel to the load.

DESCRIPTION OF THE PREFERRED EMBODIMENTS OF THE INVENTION

Figures 1, 2, 3:
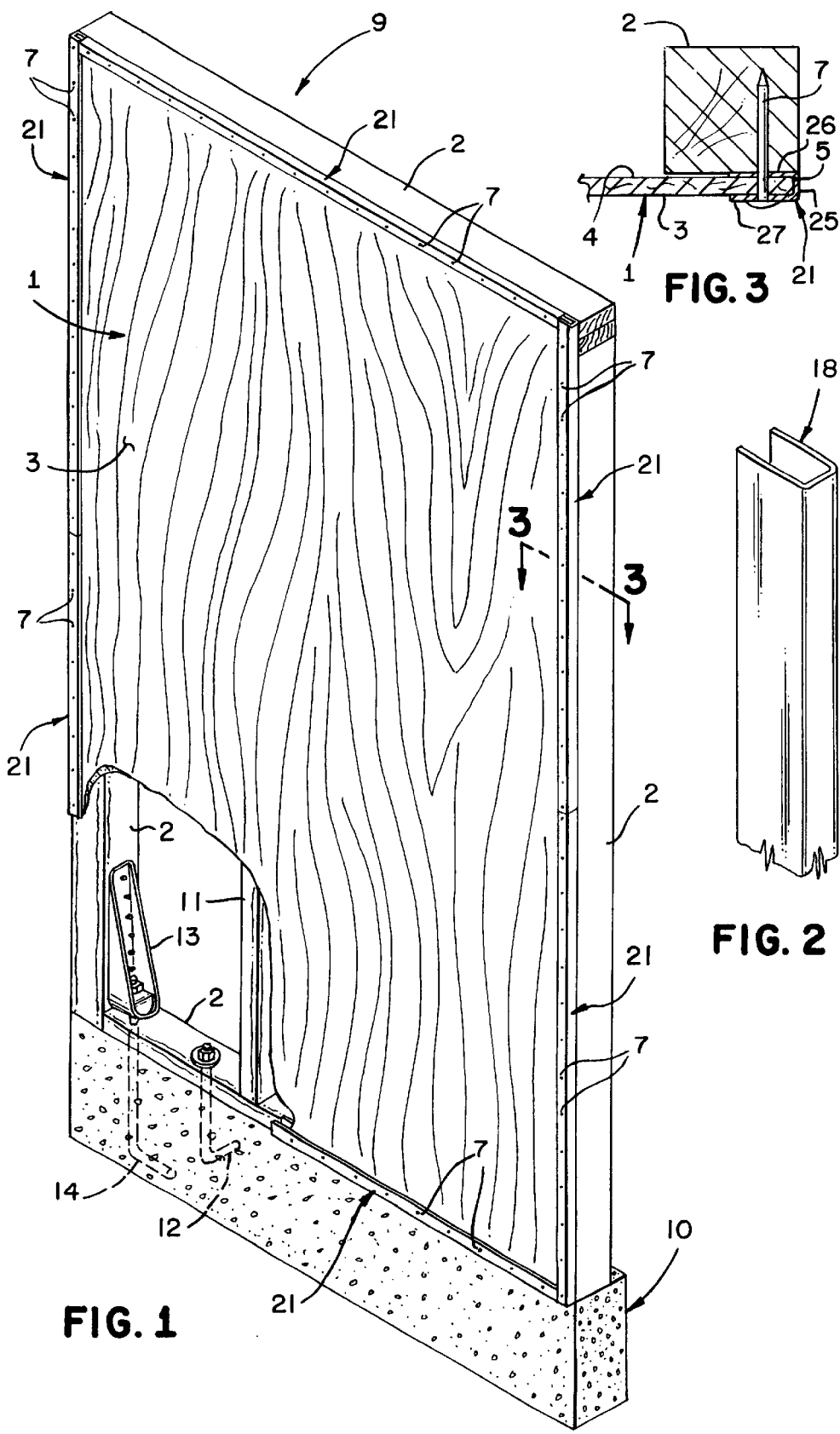
FIG. 1 is a perspective view of a vertical diaphragm or shearwall built according to the present invention.
FIG. 2 is a perspective view of a portion of a unitary perimeter edging member, formed as a subtantially u-shaped member.
FIG. 3 is cross section of a portion of a shearwall built according to the present invention taken along line 3—3 of FIG. 1, showing one of the substantially unshaped perimeter edging members with both of its flanges pierced by a perimeter fastener that connects the structural panel to a framing member.

The present invention relates to an improved mechanical connection between a structural panel 1 and the framing members 2 that support the structural panel 1 forming a diaphragm. As best shown in FIG. 1, the connection includes: a structural panel 1 having a distal side 3, a proximal side 4, and a plurality of edge faces 5; a frame 6 consisting of a plurality of framing members 2 disposed in registration with the proximal side 4 of the structural panel 1 near the edge faces 5; a plurality of perimeter fasteners 7 connecting the structural panel 1 to the framing members 2; and means for reducing bending of the perimeter fasteners attached to substantial number of the perimeter fasteners 7. The means for reducing bending of the perimeter fasteners act when lateral forces are imposed on the building structure 8 of which the diaphragm is a part.

Diaphragms can take a variety of shapes. For example, FIG. 1 shows a vertical diaphragm or shearwall 9, composed of only one structural panel 1, set on a foundation 10. The frame 6 of the shearwall 9 consists of framing members 2 disposed near the edge faces 5 of the structural panel 1 and intermediate framing members 11. Means for reducing bending of the perimeter fasteners are disposed at the perimeter of the structural panel 1. Foundation bolts 12 attach the frame 6 to the foundation 10. A holdown 13 is shown attached to the frame 6. An anchor bolt 14 is shown in FIG. 1 which attaches the holdown 13 to the foundation 10.

Figure 4:
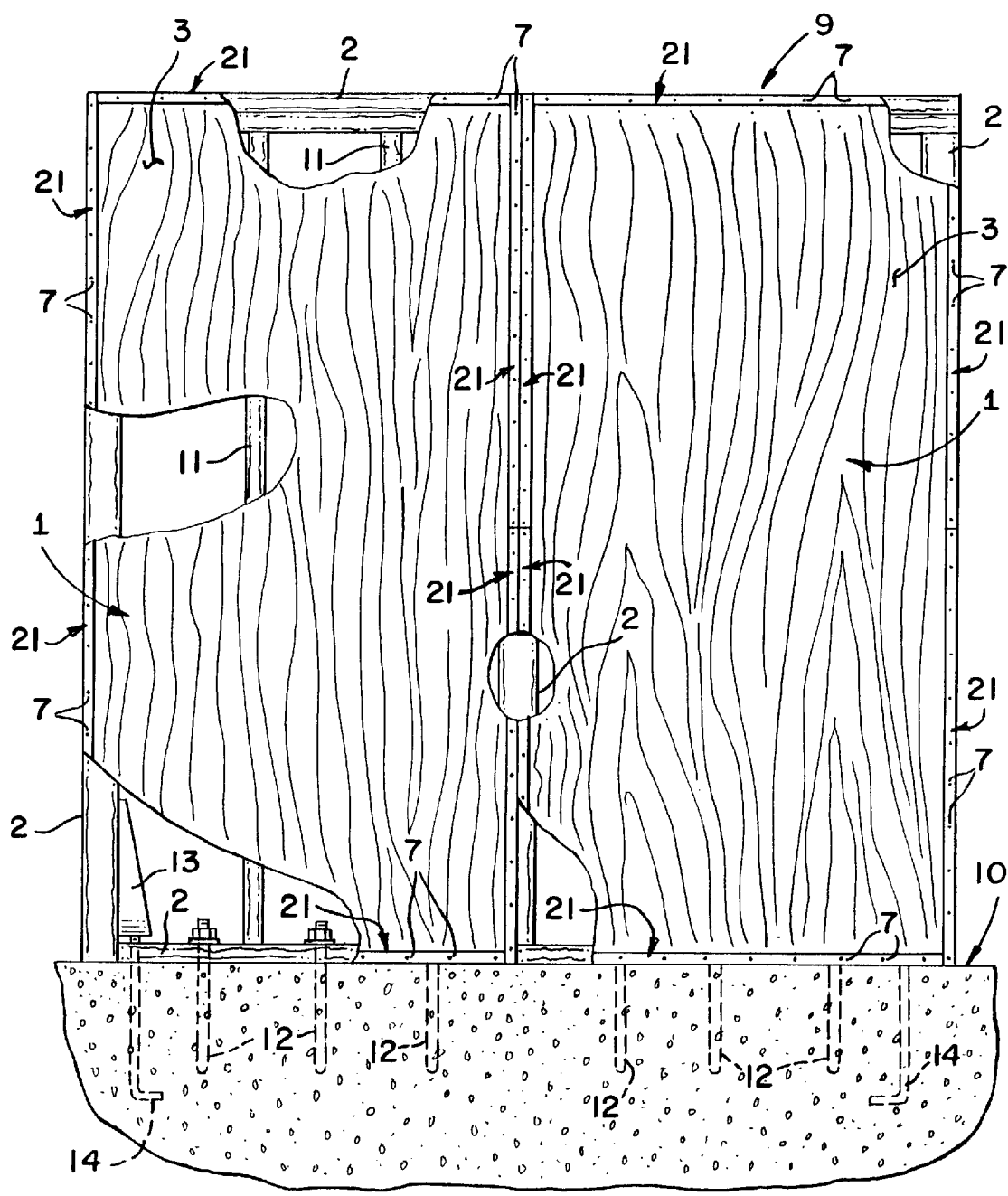
FIG. 4 is front view of a shearwall built according to the present invention. The shearwall is formed with two structural panels disposed vertically and substantially u-shaped perimeter edging members.

FIG. 4 shows a vertical diaphragm or shearwall 9, composed of two structural panels 1, set on a foundation 10. The frame 6 of the shearwall 9 consists of framing members 2 disposed near the edge faces 5 of the structural panels 1 and intermediate framing members 11. Means for reducing bending of the perimeter fasteners are disposed at the perimeter of both of the structural panels 1.

Figure 7:
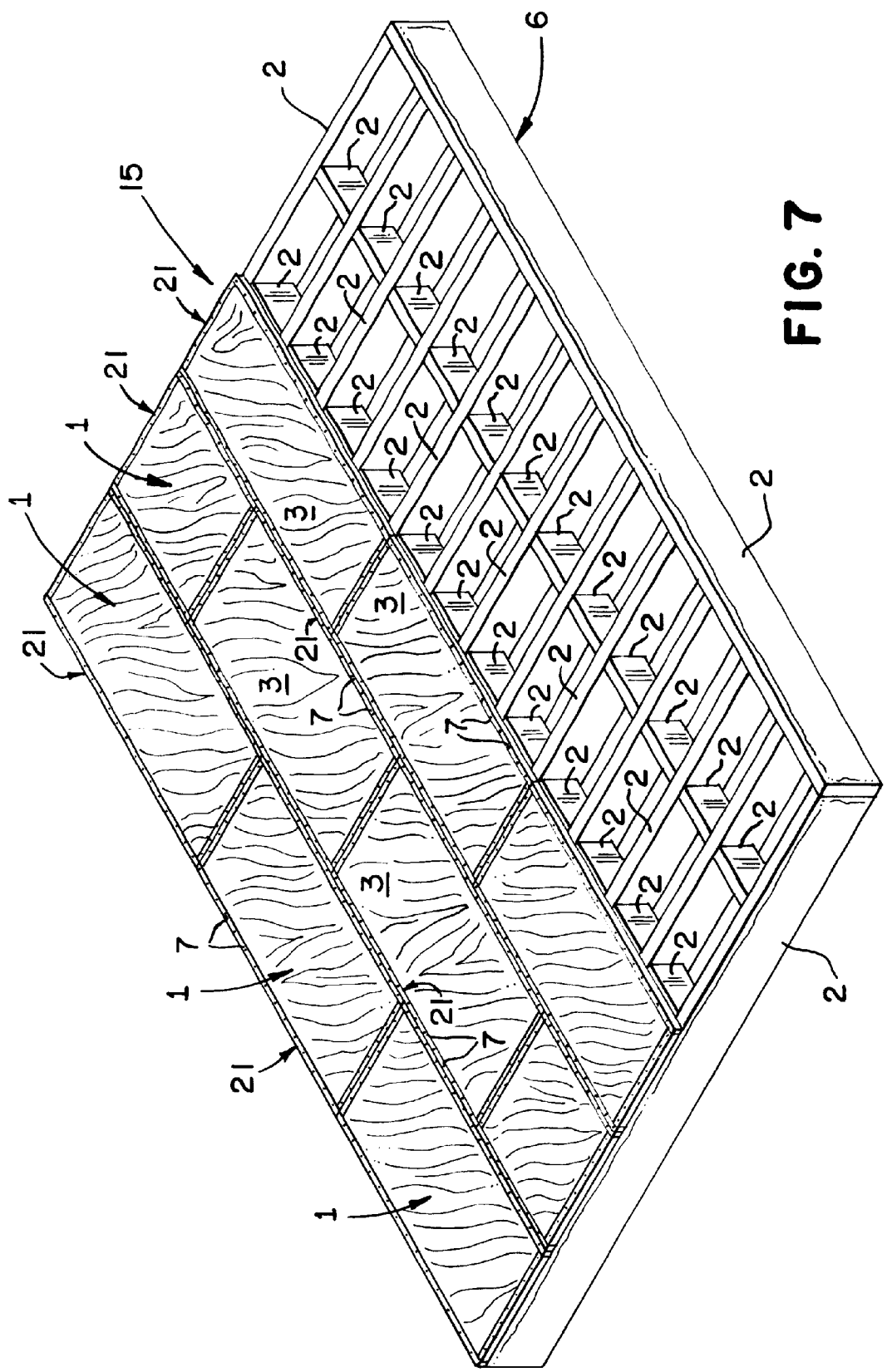
FIG. 7 is an isometric view of a horizontal diaphragm or floor being built according to the present invention.

FIG. 7 shows a horizontal diaphragm constructed as a floor 15. The frame 6 of the horizontal diaphragm consists of framing members 2. It is to be noted that because a number of different structural panels 1 will rest on a single framing member 2, and the edge faces 5 of the structural panels 1 can be offset from each other, a framing member 2 can be disposed near the edge faces 5 of some of the structural panels 1 along its length and away from the edge faces 5 of other structural panels 1 along its length. A plurality of structural panels 1 are shown already attached to the frame 6. Means for reducing bending of the perimeter fasteners are disposed at the perimeter of all the structural panels 1.

Figure 8:
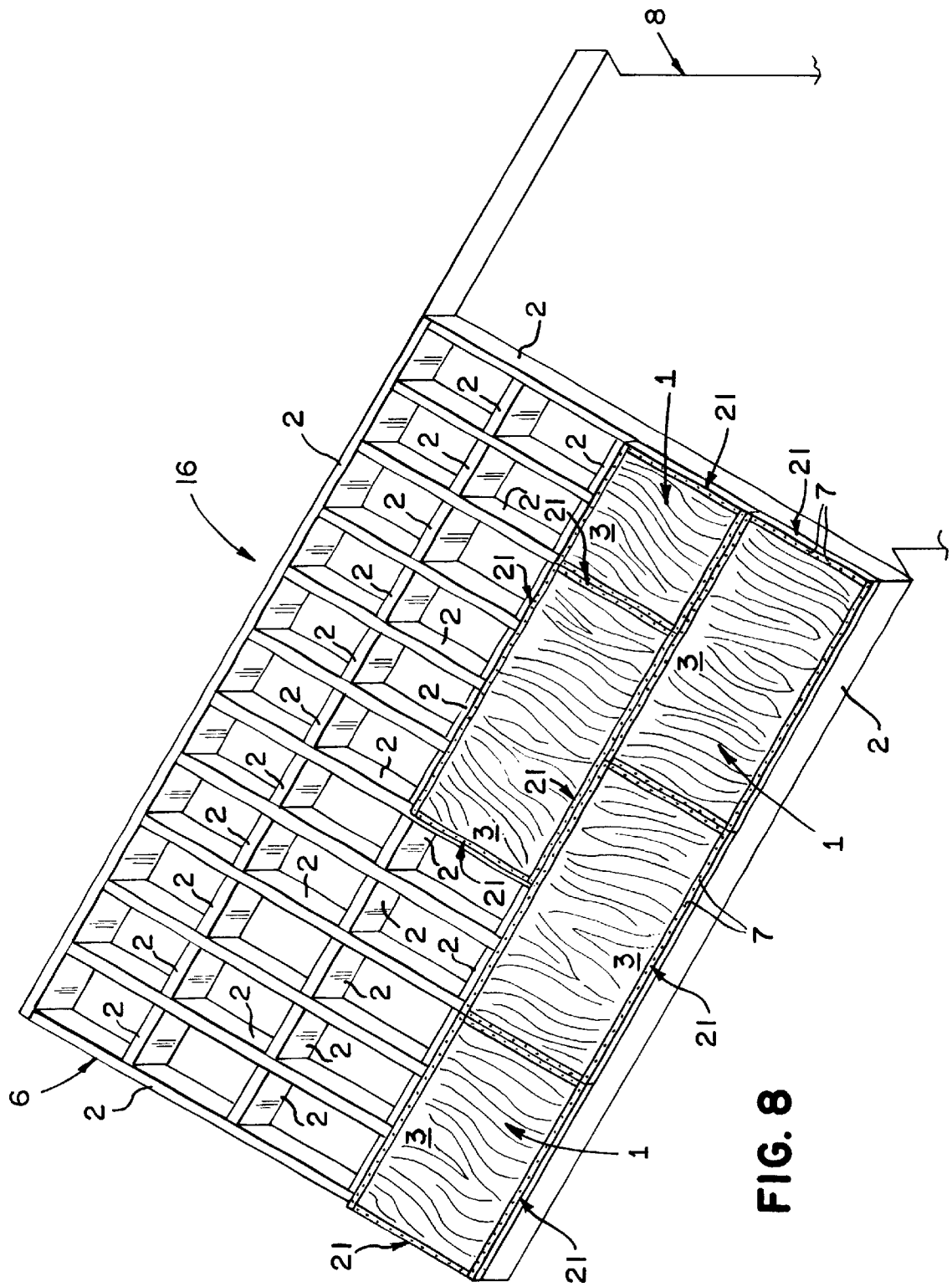
FIG. 8 is an isometetric view of a building structure, showing a horizontal diaphragm or roof being built according to the present invention.
Figure 9:
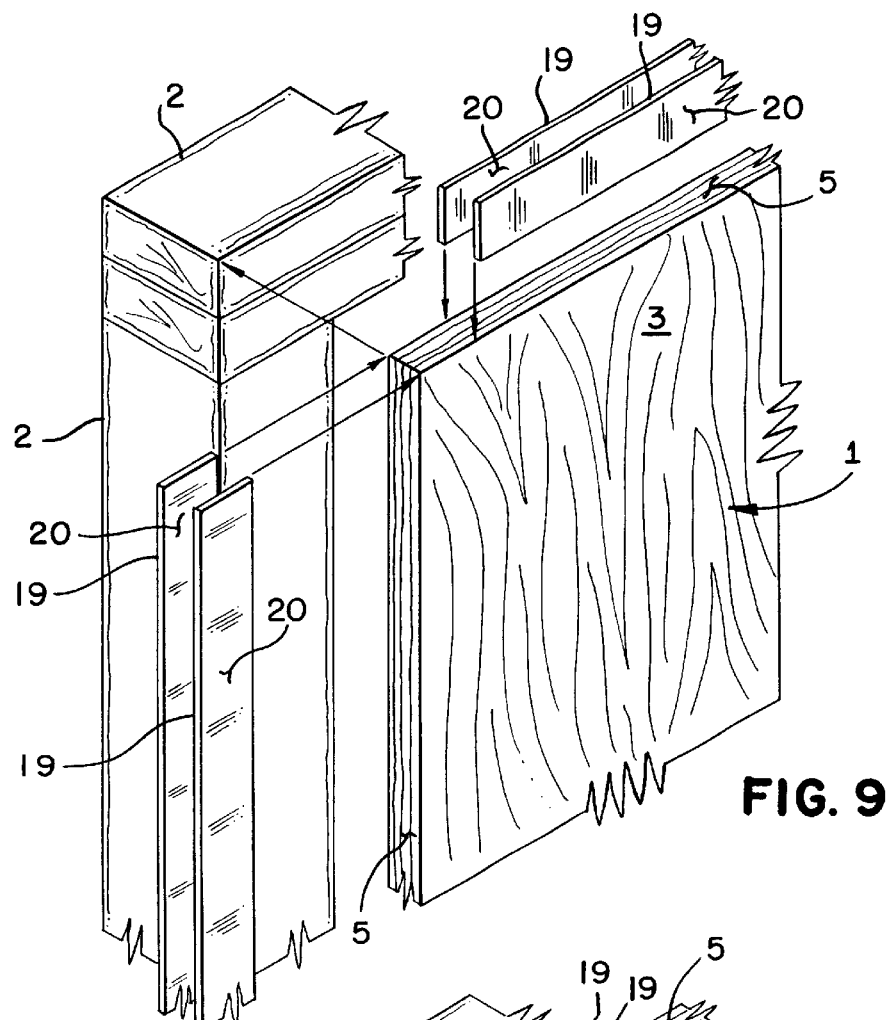
FIG. 9 is an exploded, isometric view of a portion of a frame, a portion of a structural panel and portions of perimeter edging members formed as elongated strips, showing how the elongated strips are disposed on both the distal side and the proximal side of the structural panel.
Figure 10:
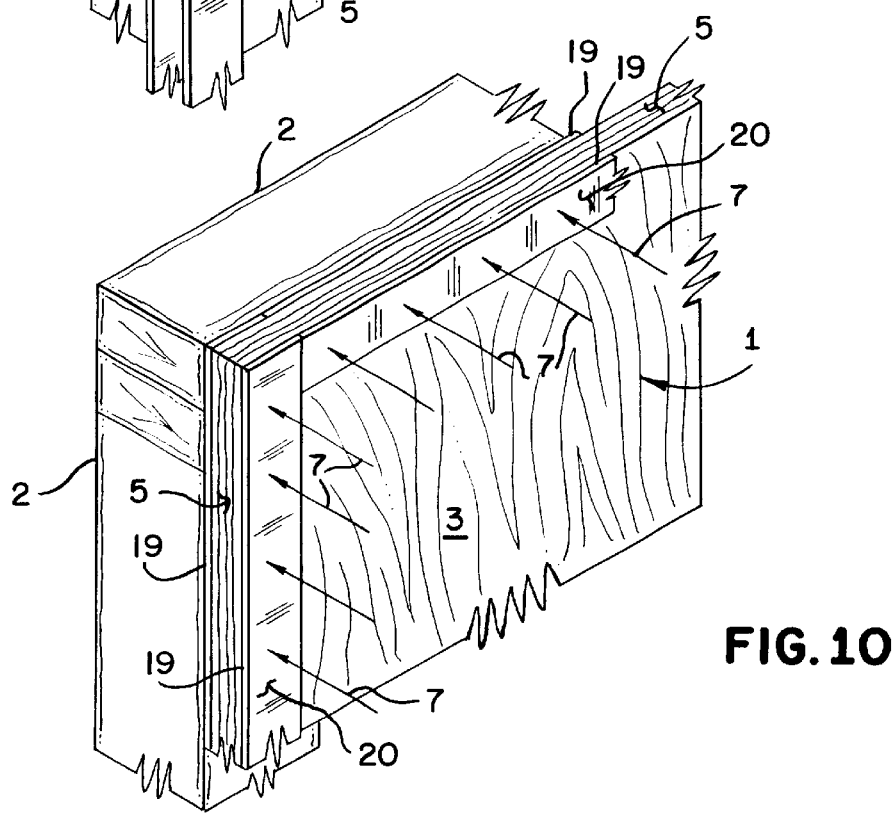
FIG. 10 is a portion of a shearwall constructed according to the present invention with perimeter edging members formed as elongated strips. The arrows represent fasteners connecting the perimeter edging members and the structural panel to the frame.

FIG. 8 also shows what is called a horizontal diaphragm, although it is disposed at an angle. FIG. 8 shows the roof 16 of a building structure 8. The roof 16 is similar in composition and construction to the floor 15 of FIG. 7.

The means for reducing bending of the perimeter fasteners can be formed in a variety of shapes; for instance, as a plurality of individual, substantially u-shaped clips 17 that work on the perimeter fasteners 7 individually, or as a single perimeter edging member 18 pierced by substantially all of the perimeter fasteners 7, or as a plurality of perimeter edging members, each of which is pierced by a plurality of perimeter fasteners 7 and which together strengthen substantially all of the perimeter fasteners 7.

The species of the present invention formed as a single perimeter edging member 18, pierced by substantially all of the perimeter fasteners 7, can be shaped in a variety of ways. Furthermore, the sub-species of the present invention formed as a plurality of perimeter edging members, each pierced by a plurality of perimeter fasteners 7, can be shaped in the same variety of ways. The subspecies formed as a plurality of perimeter edging members is essentially a single perimeter edging member 18 aportioned into smaller members, and as such their variations in shape are essentially identical. Since this is so, the various shapes possible will only be described for the subspecies formed as a plurality of perimeter edging members. The plurality of perimeter edging members can be formed as elongated strips 19 with first face members 20 pierced by the perimeter fasteners 7, or as elongated, substantially u-shaped perimeter edging members 21.

Specifically, as shown in FIGS. 17, 18 and 19, the means for reducing bending of the perimeter fasteners can consist of individual, substantially u-shaped clips 17 having central member 22 and flanges 23 and 24 extending from the central members 23, each of said u-shaped clips 17 having its flanges 23 and 24 pierced by one of the perimeter fasteners 7.

The means for reducing bending of the perimeter fasteners can also be formed as a single perimeter edging member 18 that is pierced by substantially all of the perimeter fasteners 7. See FIG. 2. The single perimeter edging member 18 is formed as continuous member disposed only near the edge faces 5 of the structural panel 1 so as to be pierced by the perimeter fasteners 7.

Figure 6:
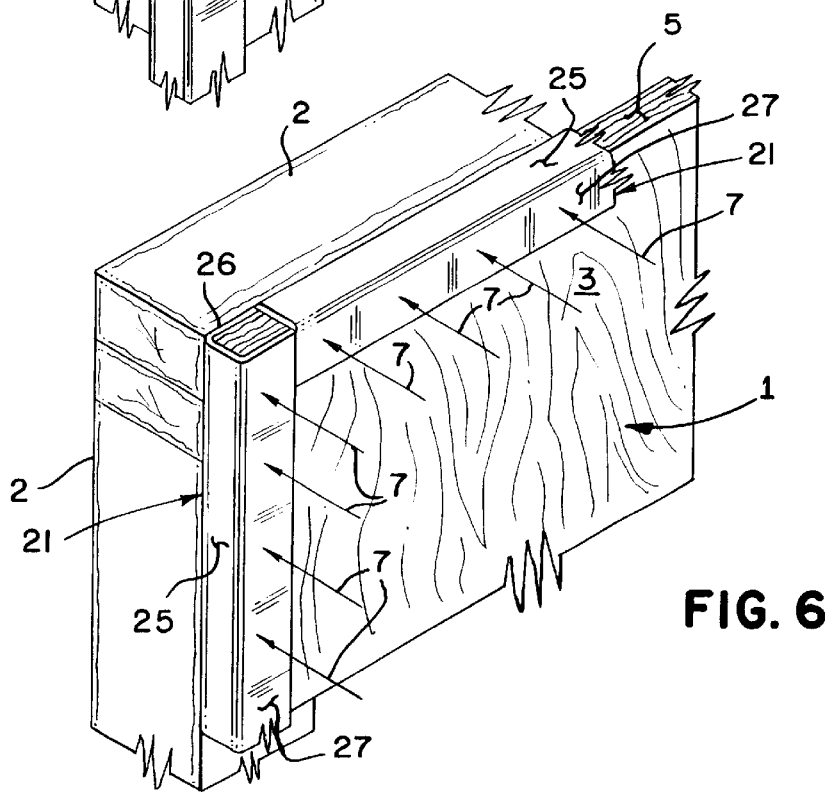
FIG. 6 is a portion of a shearwall constructed according to the present invention with substantially u-shaped perimeter edging members. The arrows represent fasteners connecting the substantially u-shaped perimeter edging members and the structural panel to the frame.

The means for reducing bending of the perimeter fasteners can also be formed as a plurality of perimeter edging members, each being pierced by a plurality of the perimeter fasteners 7, the perimeter edging members together providing resistance against bending for substantially all of the perimeter fasteners 7. These perimeter edging members can be formed as elongated strips 19 with first face members 20, as shown in FIG. 12, or preferably, as elongated, substantially u-shaped perimeter edging members 21, as shown in FIG. 6.

Figure 13:
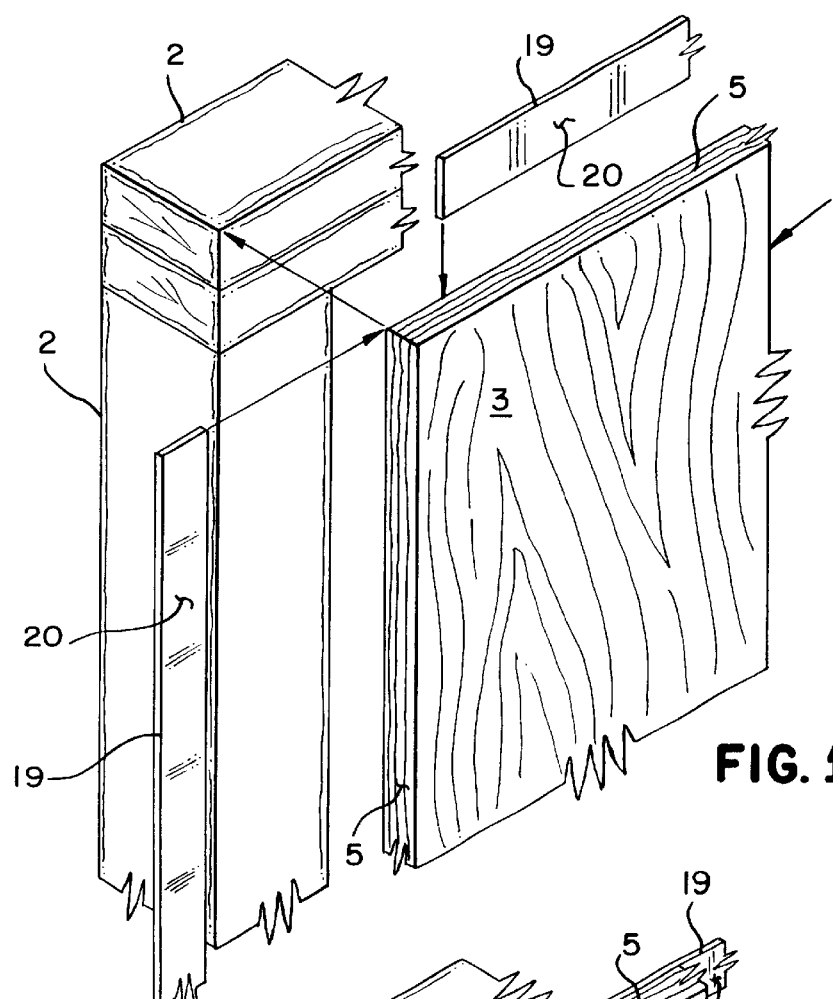
FIG. 13 is an exploded, isometric view of a portion of a frame, a portion of a structural panel and portions of perimeter edging members formed as elongated strips, showing how the elongated strips can be disposed on the proximal side of the structural panel.
Figure 14:
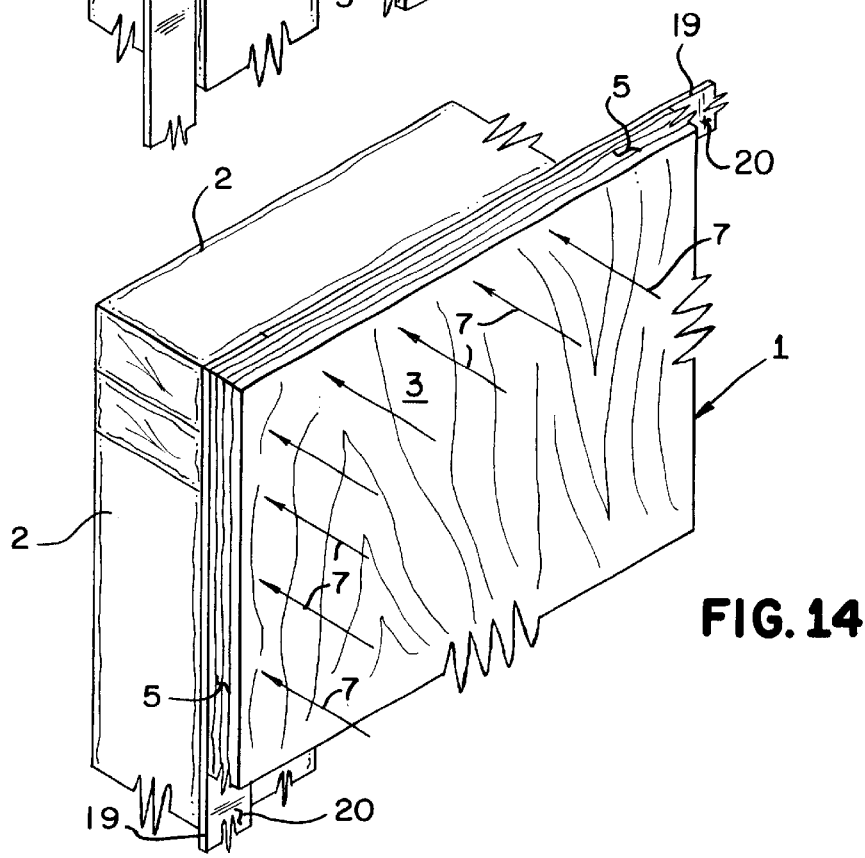
FIG. 14 is a portion of a shearwall constructed according to the present invention with perimeter edging members formed as elongated strips. The arrows represent fasteners connecting the perimeter edging members and the structural panel to the frame.

Perimeter edging members formed as elongated strips 19 with first face members 20 can be placed with the first face members 20 disposed between the proximal side 4 of the structural panel 1 and the framing members 2 near the edge faces 5 of the structural panel 1, as shown in FIGS. 13 and 14.

Figure 11:
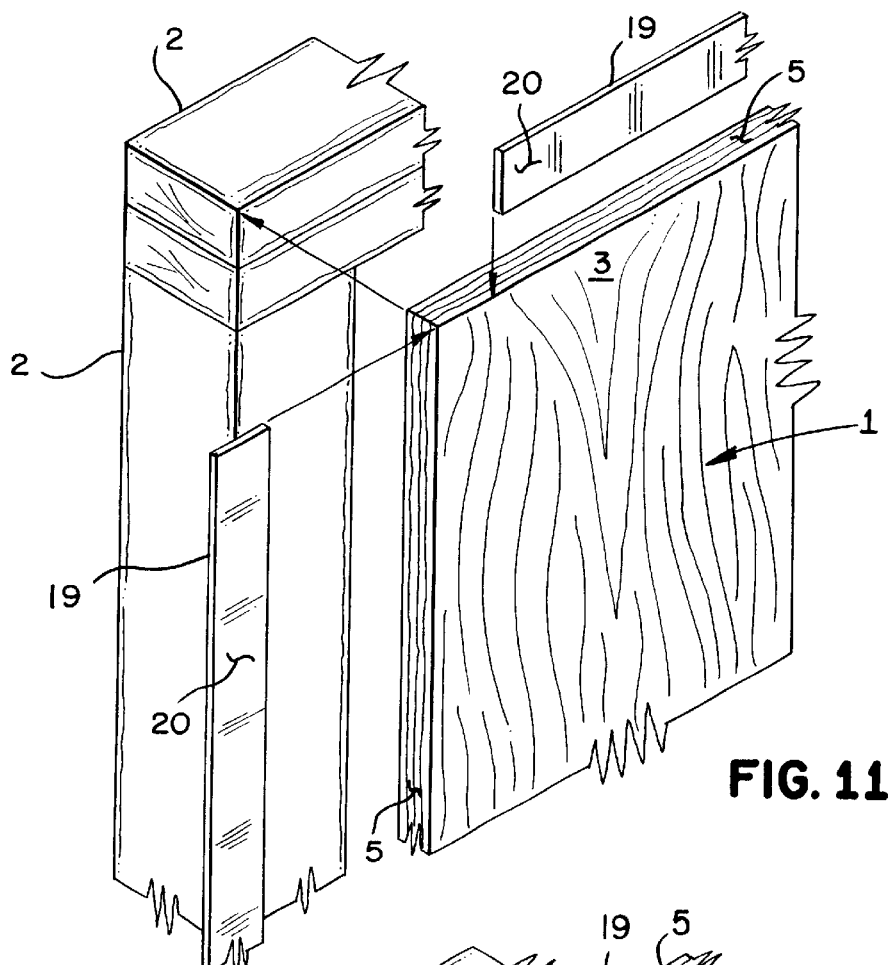
FIG. 11 is an exploded, isometric view of a portion of a frame, a portion of a structural panel and portions of perimeter edging members formed as elongated strips, showing how the elongated strips can be disposed on the distal side of the structural panel.
Figure 12:
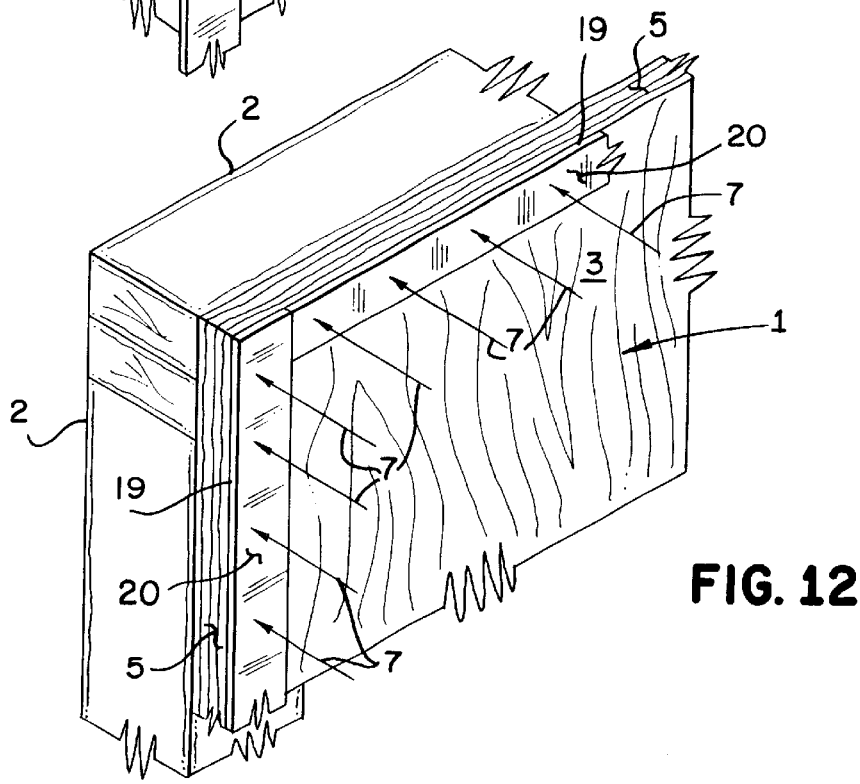
FIG. 12 is a portion of a shearwall constructed according to the present invention with perimeter edging members formed as elongated strips. The arrows represent fasteners connecting the perimeter edging members and the structural panel to the frame.

Perimeter edging members formed as elongated strips 19 with first face members 20 can also be placed with the first face members 20 disposed on the distal side 3 of the structural panel 1 near the edge faces 5 of the structural panel 1, as shown in FIGS. 11 and 12.

Figure 15:
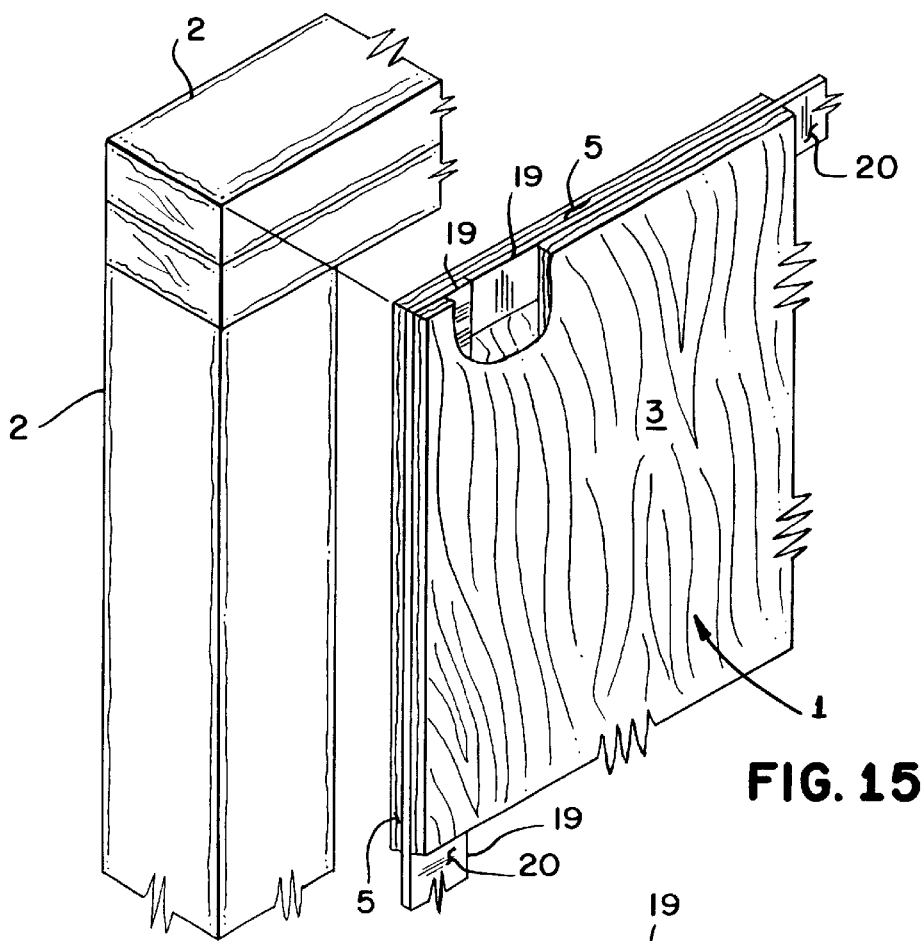
FIG. 15 is an exploded, isometric view of a portion of a frame, a portion of a structural panel and portions of perimeter edging members formed as elongated strips, showing how the elongated strips can be disposed within the structural panel.
Figure 16:
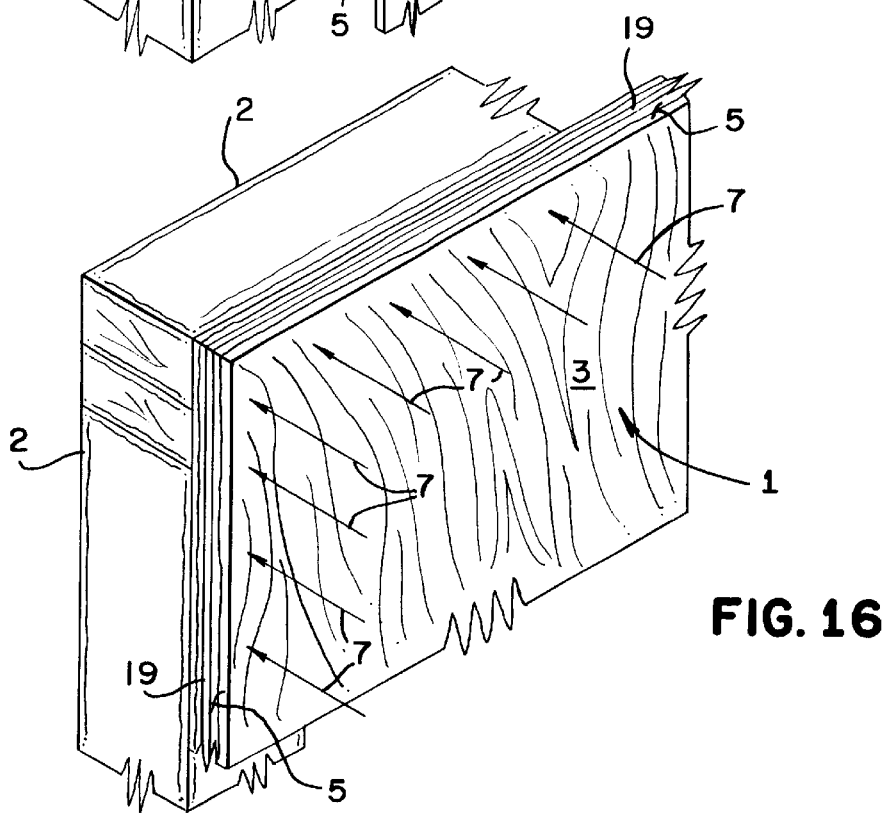
FIG. 16 is a portion of a shearwall constructed according to the present invention with perimeter edging members formed as elongated strips. The arrows represent fasteners connecting the perimeter edging members and the structural panel to the frame.

Perimeter edging members formed as elongated strips 19 with first face members 20 can be placed with the first face members 20 disposed within the structural panel 1 near the edge faces 5 of the structural panel 1, as shown in FIGS. 15 and 16. More than one layer of perimeter edging members formed as elongated strips 19 can be placed within the structural panel 1 at each edge face 5. Various combinations of the placement of the perimeter edging members formed as elongated strips 19 with first face members 20 can be used, according to the builder's preferences.

As shown in FIGS. 1 and 3, in the preferred embodiment, the perimeter edging members are formed as elongated, substantially u-shaped perimeter edging members 21, having central members 25 that have first and second flanges 26 and 27 extending from the central members 25. Both of the flanges 26 and 27 are pierced by each perimeter fastener 7 receiving the benefit of the means for reducing bending of the perimeter fasteners.

The first and second flanges 26 and 27 of the substantially u-shaped perimeter edging members can be disposed in relation to the structural panel 1 in a variety of ways, depending on the builder's preferences.

Figure 5:
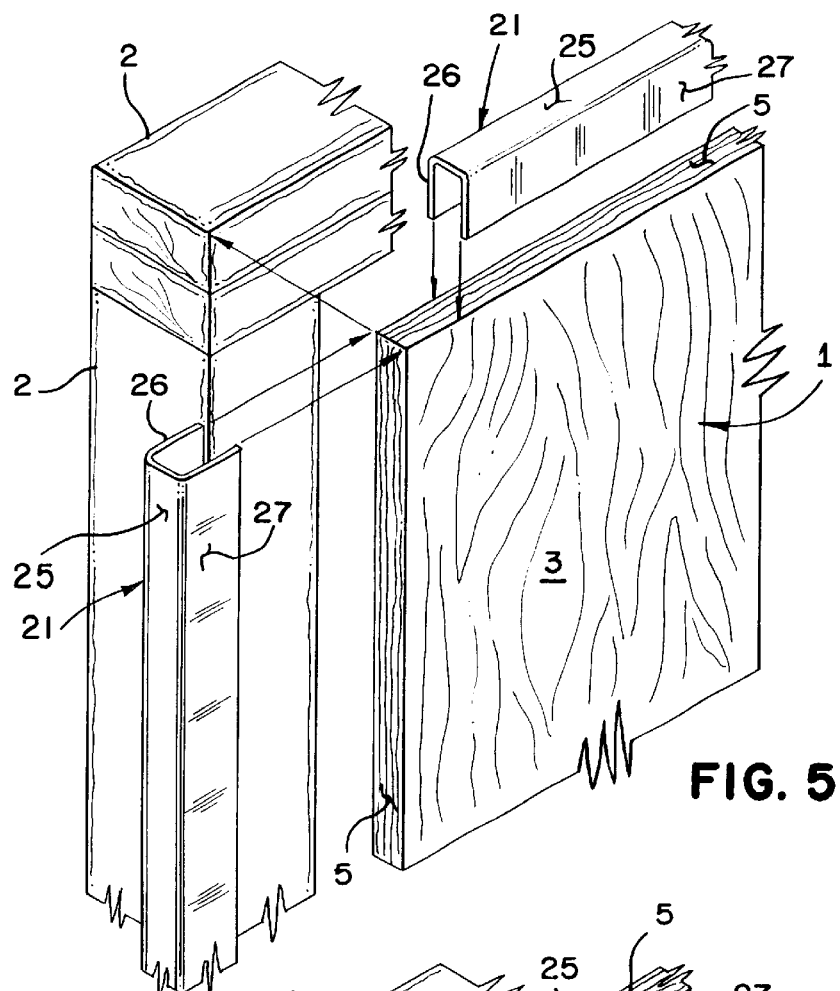
FIG. 5 is an exploded, isometric view of a portion of a frame, a portion of a structural panel and portions of substantially u-shaped perimeter edging members, showing how they are disposed in relation to each other.

The first flanges 26 of the substantially u-shaped perimeter edging members 21 can be disposed between the framing members 2 and the proximal side 4 of the structural panel 1, while the second flanges 27 are disposed on the distal side 3 of the structural panel 1 near the edge faces 5. See FIGS. 5 and 6.

Alternatively, the first flanges 26 of the substantially u-shaped perimeter edging membes 21 can be disposed within the structural panel 1 near the edge faces 5, and the second flanges 27 of the u-shaped perimeter edging members 21 can be disposed on the distal side 3 of the structural panel 1 near the edge faces 5.

The first flanges 26 of the substantially u-shaped perimeter edging members 21 can also be disposed between the framing members 2 and the proximal side 4 of the structural panel 1, and the second flanges 27 can be disposed within the structural panel 1.

Further, the first flanges 26 of the substantially u-shaped perimeter edging members 21 can be disposed within the structural panel 1 near the edge faces 5, and the second flanges 27 can also be disposed within the structural panel 1 near the edge faces 5.

As mentioned earlier, in the preferred embodiment, the means for reducing bending of perimeter fasteners is formed as a plurality of substantially u-shaped perimeter edging members 21, pierced by a plurality of perimeter fasteners 7. Substantially u-shaped perimeter edging members 21 reduce nail bending well while being easier to install than the other embodiments. By being easier to install, the preferred embodiment better ensures that all diaphragms constructed with means for reducing bending of the perimeter fasteners are uniform in the shear resisting load values they achieve.

The dimensions of the preferred substantially u-shaped perimeter edging members 21 depend on the dimensions of the structural panel 1. When used with a $15/32$" thick structural panel 1, the preferred embodiment is formed with $1/2$" central members 25 and 1" first and second flanges 26 and 27 extending from the central members 25.

The means for reducing bending of the perimeter fasteners can be made of any material that has a higher bearing strength than the structural panel 1 with which it is used. When the structural panels 1 are plywood or OSB, materials such as aluminum, steel and certain plastics could be used. In the preferred embodiment, where the structural panel is OSB, the means for reducing bending of the perimeter fasteners is formed from 20 gauge galvanized sheet metal.

The means for reducing bending of the perimeter fasteners can be bonded, mechanically attached, incorporated into the structural panels 1 or attached during assembly of the diaphragm. The preferred method is to attach the means for reducing bending of the perimeter fasteners during assembly to accommodate diaphragms of all shapes and sizes. If the diaphragm is large and will be built with a number of structural panels 1 of equal size, it may be preferable to incorporate the means for reducing bending of the perimeter fasteners into the structural panels 1 as they are created. For example, a kerf cut could be made that runs the length of each of the edge faces 5 of the structural panel 1, and then the first flanges 26 of the substantially u-shaped perimeter edging members 21 could be inserted into the kerf cuts, achieving a friction fit.

Openings can be formed in the means for reducing bending of the perimeter fasteners to facilitate hand installation of the perimeter fasteners 7; however, the preferred method is to, at least initially, drive the perimeter fastener 7 with a power tool, in which case no openings are necessary.

The perimeter edging members are preferably made in 4' lengths. Structural panels 1 are typically sold as 4'×8' panels, and a 4' long perimeter edging member integrates easily with these dimensions and is also easy to handle. See FIGS. 1 and 4.

In a larger diaphragm consisting of multiple structural panels, perimeter edging members formed as elongated strips 19 with first face members 20 can be used that are approximately 2" wide and 4' long at the joints of the structural panels 1. The 2" wide elongated strips 19 are used on both of the structural panels 1 that meet at the joint. Specifically, the elongated strips 19 overlap both structural panels 1 on either side of the joint. They are attached as if two elongated strips 19 that were 1" wide were used. Using such elongated strips 19 not only reduces the bending of the perimeter fasteners 7 for each structural panel 1 on either side of the joint, they also improve the connection between the structural panels 1 so that they act in a more unified manner.

The preferred perimeter fasteners 7 for attaching the structural panel 1 to the framing members 2 are 10d×3" long common nails. In a shearwall 9 with wood framing members 2, the perimeter fasteners 7 should be spaced around the perimeter of the structural panel 1 at 2" on center to provide the highest shear value for the shearwall 9. Less closely spaced perimeter fasteners 7 provide lower shear resistance values for the diaphragm, while more closely spaced perimeter fasteners 7 can lead to splitting of the framing members 2 when wooden framing members 2 are used. Perimeter fasteners 7 should be spaced at least $3/8$ inches from the edge faces 5 of the structural panel 1.

The structural panels 1 are also field-nailed to any portions of the frame 6 not located at the perimeter of the structural panels 1, usually at 6 to 12 inches on center. Where larger diaphragms are built that consist of more than one structural panel 1, nailing schedules may differ along the perimeter of the structural panels 1 according to where the structural panels 1 are placed in the diaphragm.

The structural panels 1 are preferably made from Oriented Strand Board $15/32$" APA Structural 1 Rated Sheeting $32/16$, Exposure 1. Higher diaphragm shears can be carried with increased structural panel 1 thickness, however, increased thickness adds cost to the materials. Structural panels 1 with the above specifications are generally sufficiently strong without being too costly.

In a 4' wide by 8' tall shearwall 9 constructed from a single 4'×8' structural panel 1 disposed vertically, with wooden framing members 2, and resting on a foundation 10, the chords or framing members disposed at the vertical edge faces of the structural panel 1 are preferably made of kiln-dried Southern Yellow Pine (MSR) 4×4s. The bottom strut that rests on the foundation 10 should be a pressure treated 2×4. The top strut or the framing member near the top edge of the structural panel 1 is preferably formed as two kiln-dried Southern Yellow Pine (MSR) 2×4s joined together.

Testing of the Present Invention

In order to characterize the improvements associated with the present invention, shearwalls were constructed in accordance with the present invention and compared to shearwalls constructed in accordance with current practices that did not make use of the present invention.

The shearwalls were tested in Brea, Calif. at the Simpson Strong-Tie Co. Laboratory on a machine designed to simulate the cyclic (reversing) lateral forces that would be imposed on a shearwall or vertical lateral force resisting system during an earthquake.

The test can be used to measure the strength of the shearwall and the stiffness of the shearwall. Stiffness of a shearwall is measured in terms of the force that is required to displace the top of the wall a given distance. The strength of a shearwall can be described in these same terms as well as by how much force is required to cause a failure of the shearwall, that is the point when the shearwall no longer provides any meaningful resistance to lateral forces. Test results are reported in tables 1 and 2 for a number of different shearwalls in terms of the force required to displace the top of the wall 0.5" under cyclic loading conditions (Load at 0.5") and the load at which failure of the wall occurs (Maximum Load). The test show that shearwalls constructed with means for reducing bending of the perimeter fasteners are both stronger and stiffer than shearwalls that did not have them.

The tests were conducted according to a protocol developed by the Joint Technical Coordinating Committee on Masonry Research (TCCMAR) in 1987. See Porter, M. L., *Sequential Phased Displacement (SPD) procedure for TCC-MAR Testing,* Proceedings of the Third Meeting of the Joint Technical Coordinating Committee on Masonry Research, US—Japan Coordinated Earthquake Research Program, Tomamu, Japan.

The TCCMAR procedure hinges on the concept of the First Major Event (FME), which is defined as the first significant limit state which occurs during the test. The FME occurs when the load capacity of the wall, upon recycling of load to the same wall displacement increment, first drops noticeably from the original load and displacement. FME for all tests was assumed to occur when an 8 foot high shearwall can be displaced 0.8 inches at its top.

The TCCMAR procedure consists of applying cycles of fully-reversing displacement to the shearwall at various increments of the wall's assumed FME. See FIG. 22.

In the first phase, three cycles of fully-reversing displacement are applied to the top of the shearwall at 25% of FME. The first phase continues by then applying three cycles of fully-reversing displacement at 50% of FME. Then, three cycles of fully-reversing displacement are applied at 75% of FME. Then, the fully-reversing displacement is increased for one cycle to 100% of FME. This is the maximum displacement for this first phase. Next, "decay" cycles of displacement for one cycle each at 75%, 50%, and 25% of the phase-maximum are applied in that order respectively. Then, three stabilizing cycles of displacement at the phase-maximum (100% of FME) are applied to the top of the shearwall. These phase-ending cycles stabilize the load-displacement response of the shearwall, prior to the next phase of testing.

In the second phase, which follows immediately according to the test frequency, one phase-maximum cycle of fully-reversing displacement is applied at 125% of FME. Next, "decay" cycles of displacement for one cycle each at 75%, 50%, and 25% of the maximum for that phase are applied in that order respectively. Then, three stabilizing cycles of displacement equal to the phase-maximum cycle (125% of FME for the second phase) are applied to the shearwall.

In the third phase, one phase-maximum cycle of fully-reversing displacement at 150% of FME is applied to the shearwall. Next, "decay" cycles of displacement for one cycle each at 75%, 50% and 25% of the phase-maximum cycle are applied. Then, three stabilizing cycles of displacement equal to the phase-maximum of the cycle (150% of FME for the third phase) are applied to the top of the shearwall.

Figure 22:
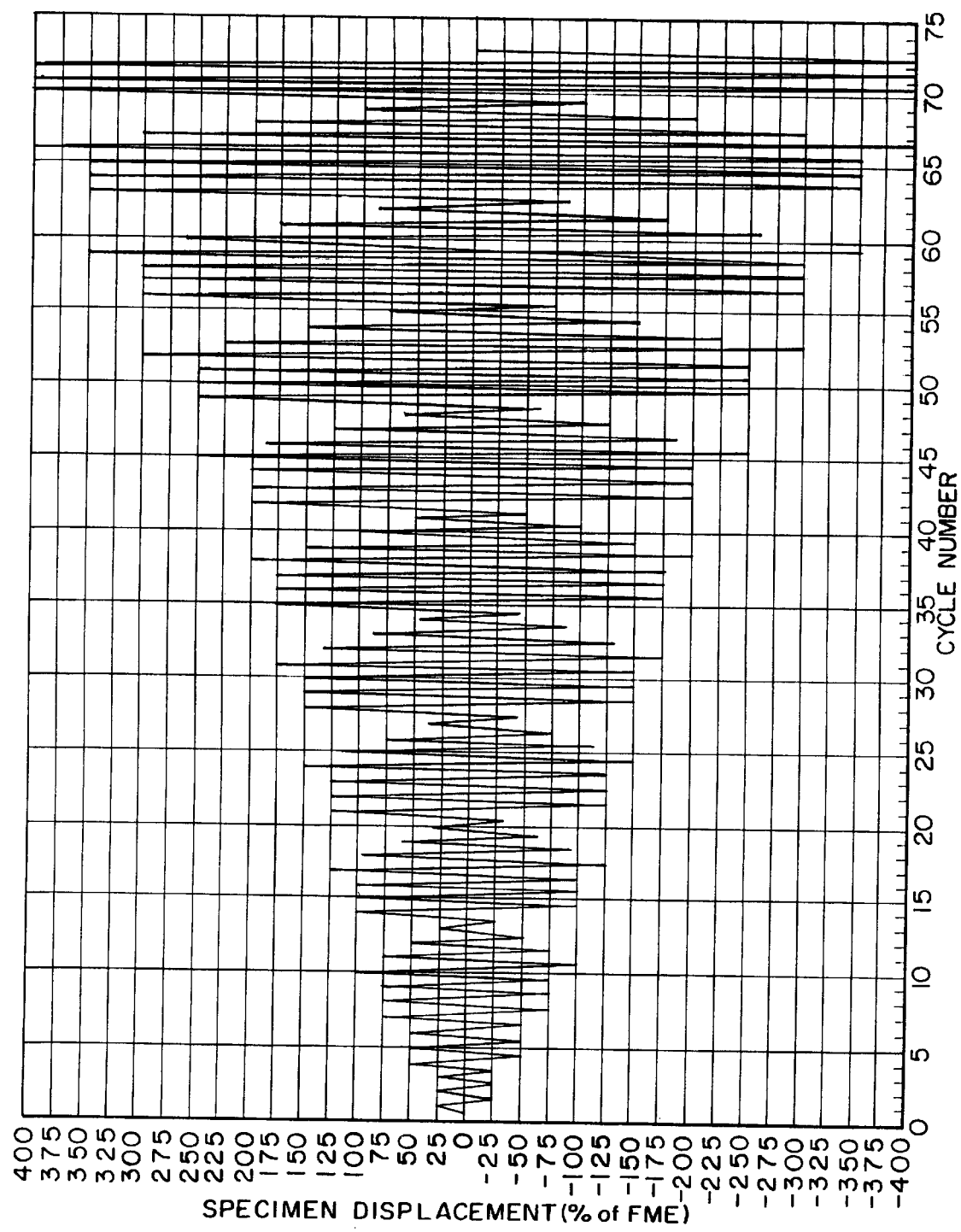
FIG. 22 is a graph showing deflection of the wall at each cycle, according to the procedure used in testing shearwalls made according to the present invention.

Successive phases are continued in a like manner as the second and third phases at increased increments, as shown in FIG. 22. The incremental cyclic load-displacement phases are continued at phase-maximums of 175%, 200%, 250%, 300%, 350% and 400% of FME, or until the wall exhibits excessive displacement, or until the wall displacement exceeds the capacity of the test equipment, which in this case was ±3.0 inches. In all trials, the lateral load capacity of the shearwall had greatly diminished by the time the shearwall was displaced 3.0 inches.

Racking shear loads were applied to the test specimens through an actuator located at the top of the wall. The actuator was placed so that the actuator did not interfere with any movement of the structural panels. The actuator that caused deflection at the top of the shearwall was computer controlled. Actuator loads were applied to the wall at a frequency of one cycle per second.

The shearwall test specimens were attached to the base of the test frame with ⅝ inch diameter anchor bolts, passing through the framing member sitting on the test frame, spaced approximately 12 inches on center, and approximately 12 inches from the ends of the shearwall.

The vertically disposed framing members, or chords, of the shearwall test specimens were attached to the test frame with holdowns and ⅞" inch anchor bolts that passed through the framing member that sat on the test frame or bottom strut. All tests were conducted with Simpson Strong-Tie PHD8 holdowns, except tests D596, F568 and F570. The shearwall of test D596 was built according to common construction practices and so used Simpson Strong-Tie HD8A holdowns. Test F568 used a modified Simpson Strong-Tie PHD8 in combination with means for reducing perimeter fastener bending to achieve even higher load values. Test F570 also used modified Simpson Strong-Tie PHD8 holdowns. This is noted in the table as "PHD8+8"". The holdowns were attached to the inner faces of the vertically dispsoed framing members. The holdowns were attached to the vertically disposed framing members with ¼" diameter by 3" long Simpson Strong Drive screws in the case of the PHD8 and PHD8+8 holdowns, and with three ⅞" diameter bolts in the case of the HD8A holdown. Anchor bolts attached the holdowns to the test frame. FIGS. 1 and 4 show typical shearwalls attached to their foundation.

Lumber used for framing in all tests was Green Douglas Fir, except for the bottom strut or framing member which sat on the test frame which was pressure treated Hem-Fir. At the time of the test, the lumber moisture content was approximately 20 to 25 percent.

The top strut or framing member at the top of the structural panel consisted of doubled 2×4s connected with 16d box nails. The top struts for each shear wall were 48" long. The framing members that sat on the test frame were also 2×4s. In addition to the above mentions framing members two intermediate 91 and ½ inches long 2×4 studs, spaced 16" on center from each other and the chords, were added and end-nailed to the horizontally disposed framing members with nails according to currently accepted building practices.

4×4s were used for the chords or vertically disposed framing members. In all tests, except test D596 which reflects current building practices, the vertically dispose framing members, or chords, were 93 inches tall. This means the chords sat directly on the test frame. Setting the chords on the test frame eliminates failure of the shearwall due to crushing of the bottom strut by the chords, and greatly improves its performance. This particular design of using long chords that bypass the bottom strut is particularly effective where the shearwall sits on the relatively non-compressible building foundation. This is demonstrated by comparing test D596 to F494. Test D596 used a 91½ inches tall 4×4 chord that sat on the bottom strut. The bottom strut or bottom plate in this test was longer to allow the chords to sit on the bottom strut.

Plywood and Oriented Strand Board structural panels were used for the structural panel or shear resisting element in the tests. For most of the tests ¹⁵⁄₃₂" APA Structural 1 Rated Sheeting ³²⁄₁₆, Exposure 1 was used. For tests F564 and F568 Oriented Strand Board with the following specifications was used: ¹⁵⁄₃₂" APA Structural 1 Rated Sheeting ³²⁄₁₆, Exposure 1.

All tests were conducted with one 4'×8' structural panel sheathing applied to the framing members with the face grain or strength axis disposed vertically.

The structural panels were fastened to the framing members by steel 10d common nails that were either 2.125" long or 3" long. All nails were driven into the framing members to a depth of at least 11 times their shank diameter to comply with the Uniform Building Code. All nails were driven so that the head of the nail sat flush against the distal side of the structural panel. When means for reducing the bending of the mechanical fasteners were used, the nails were first power-driven to start and then hand-driven to finish the attachment. All nails were spaced 2 inches on center around the periphery of the structural panel. The structural panel was attached to the intermediate studs with 10d×3" long common nails spaced 12 inches on center.

Test D568, which achieved the highest load values, used a special holdown not used in any other tests. The holdown was a modified Simpson Strong-Tie PHD8. The back of the holdown was extended to allow 8 more screws to be used to attach the holdown to the chord. Test F570 also used a modified Simpson Strong-Tie PHD8 holdown. The difference in the holdown is indicated in table 1 and table 2 as "PHD8+8"".

All means for reducing bending of perimeter fasteners were formed from 20 gauge galvanized sheet metal.

Test D596 represents a shearwall built according to current practices. No means for reducing bending of the perimeter fasteners were used. It serves as control for the other tests.

Test F495 also serves as a control for the other tests as it does not have means for reducing bending of the perimeter fasteners. The improved performance of test F495 is believed to be due to the fact that improved holdowns were used, and the chords or first and second framing members bypassed the bottom strut and sat directly on the test frame avoiding end crushing of the bottom strut.

In tests F522 and F494 substantially u-shaped perimeter edging members were added to shearwalls using improved holdowns and having chords that bypassed the bottom strut. The first flanges of the u-shaped perimeter edging members were disposed between the framing members and the proximal side of the structural panel and the second flanges were disposed on the distal side of the structural panels.

In test F551, perimeter edging members formed as elongated strips with first face members were used. A first set of perimeter edging member was placed between the framing members and the proximal side of the structural panel. A second set of perimeter edging members was placed on the distal side of the structural panel near the edge faces such that each perimeter fastener passed through two perimeter edging members.

In tests F564 and F568, substantially u-shaped perimeter edging members were used as in tests F522 and F494, however, the structural panel in both tests was made out of Oriented Strand Board rather than plywood. Test F568 also used a further improved holdown.

In test F538, perimeter edging members formed as elongated strips with face members were used as in test F551, however the perimeter edging members were only disposed between the framing members and the proximal side of the structural panel.

In test F537, the perimeter edging members formed as elongated strips with face members were disposed only on the distal side of the structural panel.

In test F570, the means for reducing bending of the perimeter fasteners consisted of individual, substantially u-shaped clips attached to the perimeter fasteners. The flanges of the u-shaped clips were disposed on the distal and proximal sides of the structural panel. Test F570 also used a further improved holdown.

TABLE 1

| TEST: | D596 | F495 | F522 | F494 | F551 | F564 | F568 |
|---|---|---|---|---|---|---|---|
| DATE: | 5/15/95 | 2/5/97 | 2/24/97 | 4/10/97 | 3/17/97 | 4/1/97 | 4/3/97 |
| nails: | 10d × 3" | 10d × 2.125" | 10d × 3" | 10d × 2.125" | 10d × 3" | 10d × 3" | 10d × 3" |
| schedule: | 2" OC | 2" OC | 2" OC | 2" OC | 2" OC | 2" OC | 2" OC |

TABLE 1-continued

| TEST: | D596 | F495 | F522 | F494 | F551 | F564 | F568 |
|---|---|---|---|---|---|---|---|
| panel: | 15/32" structural 1 plywood | 15/32" structural 1 plywood | 15/32" structural 1 plywood | 15/32" structural 1 plywood | 15/32" structural 1 plywood | 15/32" OSB | 15/32" OSB |
| chord design: | short stud | long stud | long stud | long stud | long stud | long stud | long stud |
| means for reducing bending . . . : | none | none | "u" | "u" | strip on each side | "u" | "u" |
| holdown: | HD8A | PHD8 | PHD8 | PHD8 | PHD8 | PHD8 | PHD8 + 8 |
| Load at 0.50": | 1,950 lbs. | 4,430 lbs. | 4,850 lbs. | 5,250 lbs. | 4,950 lbs. | 4,850 lbs. | 6,200 lbs. |
| Maximum Load: | 6,200 lbs. | 8,250 lbs. | 11,800 lbs. | 11,850 lbs. | 12,050 lbs. | 12,150 lbs. | 13,000 lbs. |

TABLE 2

| TEST: | D596 | F495 | F538 | F437 | F570 | F568 |
|---|---|---|---|---|---|---|
| DATE: | 5/15/95 | 2/5/97 | 3/7/97 | 3/7/97 | 4/10/97 | 4/3/97 |
| nails: | 10d × 3" | 10d × 2.125" | 10d × 3" | 10d × 3" | 10d × 3" | 10d × 3" |
| schedule: | 2" OC | 2" OC | 2" OC | 2" OC | 2" OC | 2" OC |
| panel: | 15/32" structural 1 plywood | 15/32" structural 1 plywood | 15/32" structural 1 plywood | 15/32" structural 1 plywood | 15/32" structural 1 plywood | 15/32" OSB |
| chord design: | short stud | long stud | long stud | long stud | long stud | long stud |
| means for reducing bending . . . : | none | none | strip inside | strip outside | clips | "u" |
| holdown: | HD8A | PHD8 | PHD8 | PHD8 | PHD8 + 8 | PHD8 + 8 |
| Load at 0.50": | 1,950 lbs. | 4,430 lbs. | 4,550 lbs. | 4,850 lbs. | 4,800 lbs. | 6,200 lbs. |
| Maximum Load: | 6,200 lbs. | 8,250 lbs. | 10,450 lbs. | 10,550 lbs. | 11,000 lbs. | 13,000 lbs. |

The invention is not limited to the specific form shown, but includes all forms within the definitions of the following claims.

We claim:

1. In a diaphragm for resisting lateral forces imposed on a building structure, an improved mechanical connection between a structural panel in said diaphragm and the framing members supporting said structural panel, said improved mechanical connection comprising:
   a. said structural panel having a distal side, a proximal side, and a plurality of edge faces;
   b. said plurality of framing members disposed in registration with said proximal side of said structural panel near said edge faces;
   c. a plurality of perimeter fasteners connecting said structural panel to said framing members, wherein at least two of said framing members are connected to said panel with a plurality of said perimeter fasteners; and
   d. means for reducing bending of said perimeter fasteners attached to a substantial number of said perimeter fasteners, said means for reducing bending of said perimeter fasteners acting when said lateral forces are imposed on said building structure.

2. The connection of claim 1, wherein:
said means for reducing bending of said perimeter fasteners consists of individual, substantially u-shaped clips having a central member and flanges extending from said central member, each of said u-shaped clips having said flanges pierced by one of said perimeter fasteners.

3. The connection of claim 1, wherein:
said means for reducing bending of said perimeter fasteners consists of a perimeter edging member, said perimeter edging member being pierced by substantially all of said perimeter fasteners, and said perimeter edging member being disposed near said edge faces of said structural panel.

4. The connection of claim 3, wherein:
said perimeter edging member is divided into a plurality of perimeter edging members, each being pierced by a plurality of said perimeter fasteners.

5. The connection of claim 4, wherein:
said perimeter edging members are formed as elongated members with first face members.

6. The connection of claim 5, wherein:
said first face members are disposed between said proximal side of said structural panel and said framing members near said edge faces of said structural panel.

7. The connection of claim 5, wherein:
said first face members are disposed on said distal side of said structural panel near said edge faces of said structural panel.

8. The connection of claim 5, wherein:
said first face members are disposed within said structural panel near said edge faces of said structural panel.

9. The connection of claim 5, wherein:
said perimeter edging members are disposed with said first face members disposed within said structural panel near said edge faces of said structural panel, and additional said perimeter edging members are further disposed within said structural panel near said edge faces of said structural panel.

10. The connection of claim 5, wherein:

said perimeter edging members are disposed with said first face members between said proximal side of said structural panel and said framing members, and additional said perimeter edging members are disposed with said first face members on said distal side of said structural panel near said edge faces of said structural panel.

11. The connection of claim 5, wherein:

said perimeter edging members are disposed with said first face members disposed within said structural panel near said edge faces of said structural panel, and additional said perimeter edging members are disposed with said first face members on said distal side of said structural panel near said edge faces of said structural panel.

12. The connection of claim 5, wherein:

said perimeter edging members are disposed with said first face members disposed within said structural panel near said edge faces of said structural panel, and additional said perimeter edging members are disposed with said first face members between said framing members and said proximal side of said structural panel.

13. The connection of claim 4, wherein:

said perimeter edging members are formed as elongated, substantially u-shaped members, having central members with first flanges and second flanges extending from said central members.

14. The connection of claim 13, wherein:

said first flanges of said u-shaped member are disposed between said framing members and said proximal side of said structural panel, and said second flanges are disposed on said distal side of said structural panel near said edge faces.

15. The connection of claim 13, wherein:

said first flanges of said unshaped member are disposed within said structural panel near said edge faces, and said second flanges of said u-shaped members are disposed on said distal side of said structural panel near said edge faces.

16. The connection of claim 13, wherein:

said first flanges of said unshaped member are disposed between said framing members and said proximal side of said structural panel, and said second flanges are disposed within said structural panel.

17. The connection of claim 13, wherein:

said first flanges of said unshaped member are disposed within said structural panel near said edge faces, and said second flanges are also disposed within said structural panel near said edge faces.

18. The connections of claims 14, 15, 16 or 17 wherein:

each of said perimeter fasteners protected from bending by one of said u-shaped members pierces both of said flanges of one of said u-shaped members.

19. An improved structural panel to be used with perimeter fasteners and framing members to build a diaphragm, comprising:

a structural panel having a distal side, a proximal side, and a plurality of edge faces, said structural panel being formed with means for reducing the bending of said perimeter fasteners, said means for reducing the bending of said perimeter fasteners being disposed near said edge faces of said structural panel.

20. A diaphragm for resisting lateral forces imposed on a building structure, said diaphragm comprising:

a. a structural panel having a distal side, a proximal side, and a plurality of edge faces;

b. a plurality of framing members disposed in registration with said proximal side of said structural panel near said edge faces;

c. a plurality of closely spaced perimeter fasteners connecting said structural panel to said framing members; and d. means for reducing bending of said perimeter fasteners attached to a substantial number of said perimeter fasteners.

21. A vertically disposed diaphragm for resisting lateral forces imposed on a building structure, sitting on a foundation for said building structure, said diaphragm comprising:

a. a structural panel having a distal side, a proximal side, and a plurality of edge faces;

b. a plurality of framing members disposed in registration with said proximal side of said structural panel near said edge faces, said framing members consisting of a first chord, a second chord, a top strut and a bottom strut, said first and second chords bypassing said bottom strut to sit on said foundation;

c. a plurality of closely spaced perimeter fasteners connecting said structural panel to said framing members; and d. means for reducing bending of said perimeter fasteners attached to a substantial number of said perimeter fasteners.

22. In a diaphragm for resisting lateral forces imposed on a building structure, an improved mechanical connection between a structural panel in said diaphragm and the frame supporting said structural panel, said improved mechanical connection comprising:

a. said structural panel having a distal side, a proximal side, and a plurality of edge faces;

b. said frame disposed in registration with said proximal side of said structural panel near said edge faces;

c. a plurality of closely spaced perimeter fasteners connecting said structural panel to said frame; and d. means for reducing bending of said perimeter fasteners attached to a substantial number of said perimeter fasteners, said means for reducing bending of said perimeter fasteners acting when said lateral forces are imposed on said building structure.

23. In a diaphragm for resisting lateral forces imposed on a building structure, an improved mechanical connection comprising:

a. a structural panel having a distal side, a proximal side and a plurality of edge faces;

b. a first framing member disposed in registration with said proximal side of said structural panel near one of said edge faces and a second framing member disposed in registration with said proximal side of said structural panel near a different one of said edge faces of said structural panel;

c. a plurality of perimeter fasteners connecting said structural panel to each of said framing members;

d. means for reducing bending of said perimeter fasteners attached to a substantial number of said perimeter fasteners, said means for reducing bending of said perimeter fasteners acting when said lateral forces are imposed on said building structure.

24. In a diaphragm for resisting lateral forces imposed on a building structure, an improved mechanical connection comprising:

a. a structural panel having a distal side, a proximal side and a plurality of edge faces;

b. a first framing member disposed in registration with said proximal side of said structural panel near one of said edge faces and a second framing member disposed in registration with said proximal side of said structural panel near a different one of said edge faces of said structural panel;

c. a plurality of perimeter fasteners connecting said structural panel to each of said framing members;

d. means for reducing bending of said perimeter fasteners attached to at least one of said perimeter fasteners, said means for reducing bending of said perimeter fasteners acting when said lateral forces are imposed on said building structure.

25. In a diaphragm for resisting lateral forces imposed on a building structure, an improved mechanical connection comprising:

a. a structural panel having a distal side, a proximal side and a plurality of edge faces;

b. a first framing member disposed in registration with said proximal side of said structural panel near one of said edge faces and a second framing member disposed in registration with said proximal side of said structural panel near a different one of said edge faces of said structural panel, said framing member each having two ends;

c. a plurality of perimeter fasteners connecting said structural panel to each of said framing members;

d. means for reducing bending of said perimeter fasteners attached to a plurality of said perimeter fasteners located near one of said ends of one of said framing members, said means for reducing bending of said perimeter fasteners acting when said lateral forces are imposed on said building structure.

26. In a diaphragm for resisting lateral forces imposed on a building structure, an improved mechanical connection comprising:

a. one or more structural panels, each having a distal side, a proximal side and a plurality of edge faces;

b. a first elongated framing member disposed in registration with said proximal sides of said one or more structural panels near one of said edge faces of each of said one or more structural panels and one or more second elongated framing members disposed in registration with said proximal sides of said one or more structural panels near a different one of said edge faces of each of said one or more structural panels;

c. a plurality of perimeter fasteners connecting said one or more structural panels to each of said framing members along substantially the entire length of said framing members, said perimeter fasteners being spaced approximately 2" apart in a direction generally parallel to said edge faces of said one or more structural panels to which said framing members are connected;

d. means for reducing bending of said perimeter fasteners attached to at least one of said perimeter fasteners, said means for reducing bending of said perimeter fasteners acting when said lateral forces are imposed on said building structure.

27. In a diaphragm for resisting lateral forces imposed on a building structure, an improved mechanical connection comprising:

a. one or more structural panels, each having a distal side, a proximal side and a plurality of edge faces;

b. an first elongated framing member disposed in registration with said proximal sides of said one or more structural panels near one of said edge faces of each of said one or more structural panels and one or more second elongated framing members disposed in registration with said proximal sides of said one or more structural panels near a different one of said edge faces of each of said one or more structural panels;

c. a plurality of perimeter fasteners connecting said one or more structural panels to each of said framing members along substantially the entire length of said framing members, said perimeter fasteners being spaced approximately 1.0" to 4" apart in a direction generally parallel to said edge face of said one or more structural panels to which said framing members are connected;

d. means for reducing bending of said perimeter fasteners attached to at least one of said perimeter fasteners, said means for reducing bending of said perimeter fasteners acting when said lateral forces are imposed on said building structure.

28. In a diaphragm for resisting lateral forces imposed on a building structure, an improved mechanical connection comprising:

a. a structural panel having a distal side, a proximal side and a plurality of edge faces;

b. a framing member disposed in registration with said proximal side of said structural panel near one of said edge faces and a second framing member disposed in registration with said proximal side of said structural panel near one of said edge faces of said structural panel, said framing members, each having two ends;

c. a plurality of perimeter fasteners connecting said structural panel to each of said framing members;

d. means for reducing bending of said perimeter fasteners attached to a plurality of said perimeter fasteners located near one of said ends of one of said framing members, said means for reducing bending of said perimeter fasteners not extending beyond said diaphragm, and said means for reducing bending of said perimeter fasteners acting when said lateral forces are imposed on said building structure.

29. The connection of claims 1, 20, 22, 23, 24, 25, 26, 27, or 28 wherein:

said perimeter fasteners are nails.

30. The connection of claims, 1, 20, 22, 23, 24, 25, 26, 27, or 28 wherein:

said perimeter fasteners do not pass all the way through said framing members.

31. The connection of claims 1, 20, 22, 23, 24, 25, 26, 27, or 28 wherein:

said structural panel is made from wood.

32. The connection of claims 1, 20, 22, 23, 24, 25, 26, 27, or 28 wherein:

said structural panel is supported near all of said edge faces.

33. The connection of claims 24, 26, or 27 wherein:

a. said means for reducing bending of said perimeter fasteners are attached to a plurality of said perimeter fasteners attached to said first framing members; and b. said means for reducing bending of said perimeter fasteners are attached to a plurality of said perimeter fasteners attached to said second framing member.

34. The connection of claims 1, 19, 20, 21, 22, 23, 24, 25, 26, 27, or 28 wherein:

said means for reducing bending of said perimeter fasteners is made from light gauge, sheet metal.

35. In a diaphragm for resisting lateral forces imposed on a building structure, an improved mechanical connection comprising:
   a. one or more structural panels, each having a distal side, a proximal side and a plurality of edge faces;
   b. a first elongated framing member disposed in registration with said proximal sides of said one or more structural panels near one of said edge faces of each of said one or more structural panels and one or more second elongated framing members disposed in registration with said proximal sides of said one or more structural panels near a different one of said edge faces of each of said one or more structural panels;
   c. a plurality of perimeter fasteners connecting said one or more structural panels to each of said framing members, said perimeter fasteners not passing all the way through said framing members; and
   d. means for reducing bending of said perimeter fasteners attached to at least several perimeter fasteners of said plurality of perimeter fasteners connecting said one or more structural panels to each of said framing members, said means for reducing bending of said perimeter fasteners acting when said lateral forces are imposed on said building structure, said means for reducing bending of said perimeter fasteners having portions disposed on said distal sides of said one or more structural panels, and said means for reducing bending of said perimeter fasteners not extending beyond said framing members.

36. The connection of claim 35 wherein:

said plurality of perimeter fasteners are closely spaced.

37. The connection of claim 36 wherein:

said plurality of perimeter fasteners are spaced approximately 2" apart in a direction generally parallel to said edge faces of said one or more structural panels to which said framing members are connected.

38. The connection of claim 36 wherein:

said one or more structural panels are made from wood.

* * * * *

UNITED STATES PATENT AND TRADEMARK OFFICE
CERTIFICATE OF CORRECTION

PATENT NO. : 6,643,986 B2
DATED : November 11, 2003
INVENTOR(S) : Alfred D. Commins and Robert C. Gregg It is certified that error appears in the above-identified patent and that said Letters Patent is hereby corrected as shown below:

Column 4,
Line 9, replace "unshaped" with -- u-shaped --.

Column 5,
Line 29, replace "FIG. 1, the connection" with -- FIG. 1, the preferred embodiment of the --.

Column 6,
Line 14, replace "or as a single" with -- or as in the preferred embodiment a single --.
Line 18, replace "together strengthen" with -- together preferably strengthen --.
Line 27, replace "members is essentially" with -- members in the preffered embodiments is essentially --.
Line 55, replace "fastener 7 the perimeter" with -- fastener 7 preferably the perimeter --.

Column 10,
Line 67, replace "dispsoed" with -- disposed --.

Column 13,
Table 1, under TEST, F495 and in line designated "Load at .050":" replace "4,430 lbs" with -- 4,400 lbs. --.
Table 1, under TEST: F522 and in the line designated "Load at 0.50":" replace "4,850, lbs." with -- 4,650 lbs. --.
Table 2, under TEST replace "F437" with -- F4537 --.
Table 2, under TEST: F495 and in the line designated "Load at 0.50":" replace "4,800 lbs." with -- 4,600 lbs. --.

Column 15,
Lines 39, 45 and 50, replace "unshaped" with -- u-shaped --.

Column 18,
Line 6, replace "an" with -- a --.

UNITED STATES PATENT AND TRADEMARK OFFICE
CERTIFICATE OF CORRECTION

PATENT NO. : 6,643,986 B2
DATED : November 11, 2003
INVENTOR(S) : Alfred D. Commins and Robert C. Gregg It is certified that error appears in the above-identified patent and that said Letters Patent is hereby corrected as shown below:

<u>Column 18 (cont'd),</u>
Line 63, replace "members;" with -- member; --.

Signed and Sealed this

Thirteenth Day of July, 2004

JON W. DUDAS
*Acting Director of the United States Patent and Trademark Office*